US010157378B1

(12) United States Patent
Wilson et al.

(10) Patent No.: US 10,157,378 B1
(45) Date of Patent: *Dec. 18, 2018

(54) ANTICIPATORY CREATION OF POINT-OF-SALE DATA STRUCTURES

(71) Applicant: Square, Inc., San Francisco, CA (US)

(72) Inventors: Mathew Wilson, Sausalito, CA (US); Dan Simms, San Francisco, CA (US); Derrick Huhn, San Francisco, CA (US); Ryder Moody, San Francisco, CA (US); Jonathan Andrew Wolter, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/253,172

(22) Filed: Aug. 31, 2016

Related U.S. Application Data

(63) Continuation of application No. 14/871,776, filed on Sep. 30, 2015, now Pat. No. 9,569,757.

(51) Int. Cl.
*G06F 7/00* (2006.01)
*G06Q 20/20* (2012.01)
(Continued)

(52) U.S. Cl.
CPC .......... *G06Q 20/204* (2013.01); *G06Q 10/02* (2013.01); *G06Q 20/202* (2013.01); *G06Q 20/401* (2013.01)

(58) Field of Classification Search
CPC ...... G06Q 10/02; G06Q 10/025; G06Q 30/02; G06Q 10/087; G06Q 40/00; G06Q 30/0601; G06Q 10/06

(Continued)

(56) References Cited

U.S. PATENT DOCUMENTS

| 5,664,110 A | 9/1997 | Green et al. |
| 6,732,934 B2 * | 5/2004 | Hamilton ............. G06Q 20/343 235/378 |

(Continued)

FOREIGN PATENT DOCUMENTS

| WO | 2016/168298 A2 | 10/2016 |
| WO | 2017/116610 A1 | 7/2017 |

OTHER PUBLICATIONS

Final Office Action dated Sep. 27, 2016, for U.S. Appl. No. 14/686,381, of Renke, C.P., et al., filed Apr. 14, 2015.

(Continued)

*Primary Examiner* — Andrew Joseph Rudy
(74) *Attorney, Agent, or Firm* — Lee & Hayes, PLLC

(57) ABSTRACT

Techniques and arrangements for analyzing previous tickets of a customer at different merchants—specifying interactions of the customer at the different merchants—to determine subsequent recommendations to send to a particular merchant in real-time when the customer is located at the particular merchant. Other techniques and arrangements facilitate annotation of merchant tickets by the merchants to enrich the data maintained by the tickets and, in some instances, to enhance the described real-time recommendations. Still other techniques and arrangements create a merchant ticket for recording interactions between a merchant and customer upon the customer creating a reservation at the merchant for a specified future time, or being added to a waitlist of the merchant. Upon the customer arriving at the merchant proximate to the specified future time, the merchant may use the created ticket to track items ordered by the merchants, track tenders used to pay for items, and the like.

20 Claims, 13 Drawing Sheets

(51) Int. Cl.
*G06Q 10/02* (2012.01)
*G06Q 20/40* (2012.01)

(58) Field of Classification Search
USPC .......... 705/5–7, 14.23, 14.66, 26.1; 235/375, 235/379, 376
See application file for complete search history.

(56) References Cited

U.S. PATENT DOCUMENTS

| | | | | |
|---|---|---|---|---|
| 6,920,431 | B2* | 7/2005 | Showghi | G06Q 10/02 705/15 |
| 7,071,842 | B1* | 7/2006 | Brady, Jr. | H04W 4/029 340/988 |
| 7,117,183 | B2* | 10/2006 | Blair | G06Q 10/02 235/375 |
| 7,257,547 | B1 | 8/2007 | Terase | |
| 7,721,969 | B2* | 5/2010 | Johnson | G06Q 20/12 235/462.44 |
| 7,835,990 | B2* | 11/2010 | Coleman | G06F 21/6254 705/14.66 |
| 8,028,896 | B2* | 10/2011 | Carter | G06Q 10/0633 235/379 |
| 8,370,207 | B2* | 2/2013 | Edwards | G06Q 30/0201 705/26.1 |
| 8,498,900 | B1 | 7/2013 | Spirin et al. | |
| 8,671,002 | B2* | 3/2014 | Stefik | G06Q 10/02 705/1.1 |
| 8,694,456 | B2* | 4/2014 | Grigg | G06Q 30/02 706/46 |
| 8,732,193 | B2* | 5/2014 | Skeen | G06F 17/30752 705/14.23 |
| 8,769,304 | B2* | 7/2014 | Kirsch | G06Q 20/0855 380/30 |
| 8,831,677 | B2* | 9/2014 | Villa-Real | H04M 1/66 455/552.1 |
| 9,111,323 | B2* | 8/2015 | Freeman | G06Q 30/00 |
| 9,218,413 | B2* | 12/2015 | Skeen | G06F 17/30752 |
| 9,569,757 | B1 | 2/2017 | Wilson et al. | |
| 9,674,669 | B2* | 6/2017 | Subramanian | H04W 4/04 |
| 9,807,086 | B2* | 10/2017 | Nordstrom | H04L 63/0846 |
| 2002/0092912 | A1 | 7/2002 | Hamilton et al. | |
| 2003/0046166 | A1 | 3/2003 | Liebman | |
| 2003/0050854 | A1 | 3/2003 | Showghi et al. | |
| 2004/0054592 | A1 | 3/2004 | Hernblad | |
| 2004/0143512 | A1 | 7/2004 | Sturr, Jr. | |
| 2004/0243468 | A1* | 12/2004 | Cohagan | G06Q 30/02 705/14.23 |
| 2005/0071232 | A1 | 3/2005 | Frater | |
| 2005/0108116 | A1 | 5/2005 | Dobson et al. | |
| 2006/0255128 | A1 | 11/2006 | Johnson et al. | |
| 2009/0037286 | A1 | 2/2009 | Foster | |
| 2012/0166332 | A1 | 6/2012 | Naaman | |
| 2012/0173396 | A1 | 7/2012 | Melby et al. | |
| 2013/0204718 | A1 | 8/2013 | Freeman | |
| 2014/0164234 | A1 | 6/2014 | Coffman et al. | |
| 2014/0279098 | A1 | 9/2014 | Ham | |
| 2014/0330654 | A1 | 11/2014 | Turney et al. | |
| 2014/0365286 | A1* | 12/2014 | Samoville | G06Q 30/0249 705/14.23 |
| 2015/0039450 | A1 | 2/2015 | Hernblad | |
| 2015/0120344 | A1 | 4/2015 | Rose | |
| 2015/0120345 | A1* | 4/2015 | Rose | G06O 50/12 705/5 |
| 2015/0134441 | A1 | 5/2015 | Balar et al. | |
| 2015/0235254 | A1 | 8/2015 | Carroll-Boser et al. | |
| 2015/0310408 | A1 | 10/2015 | Anderson | |
| 2015/0324937 | A1 | 11/2015 | Callahan | |
| 2016/0267448 | A1 | 9/2016 | James et al. | |
| 2016/0307176 | A1 | 10/2016 | Renke et al. | |
| 2017/0193470 | A1 | 7/2017 | Renke et al. | |
| 2017/0193488 | A1 | 7/2017 | Renke et al. | |

OTHER PUBLICATIONS

International Search Report and Written Opinion for International Application No. PCT/US2016/027288, dated Sep. 30, 2016.
Non-Final Office Action dated Jul. 30, 2015, for U.S. Appl. No. 14/686,381 of Renke, C. P., et al., filed Apr. 14, 2015.
Final Office Action dated Nov. 10, 2015, for U.S. Appl. No. 14/686,381 of Renke, C. P., et al., filed Apr. 14, 2015.
Non-Final Office Action dated Dec. 17, 2015, for U.S. Appl. No. 14/871,776 of Wilson, M., et al., filed Sep. 30, 2015.
Advisory Action dated Jan. 22, 2016, for U.S. Appl. No. 14/686,381 of Renke, C. P., et al., filed Apr. 14, 2015.
Non-Final Office Action dated Apr. 8, 2016, for U.S. Appl. No. 14/686,381 of Renke, C. P., et al., filed Apr. 14, 2015.
Non-Final Office Action dated May 9, 2016, for U.S. Appl. No. 14/985,528, of Renke, C.P., et al., filed Dec. 31, 2015.
Notice of Allowance dated Jun. 29, 2016, for U.S. Appl. No. 14/871,776 of Wilson, M., et al., filed Sep. 30, 2015.
Final Office Action dated Nov. 29, 2016, for U.S. Appl. No. 14/985,528, of Renke, C.P., et al., filed Dec. 31, 2015.
International Search Report and Written Opinion for International Patent Application No. PCT/US2016/064710, dated May 11, 2017.
Notice of Allowance dated Aug. 4, 2017, for U.S. Appl. No. 14/686,381, of Renke, C.P., et al., filed Apr. 14, 2015.
Non-Final Office Action dated Aug. 11, 2017, for U.S. Appl. No. 14/985,528, of Renke, C.P., et al., filed Dec. 31, 2015.
Non-Final Office Action dated Jan. 17, 2018, for U.S. Appl. No. 14/871,714, of Wilson, M., et al., filed Sep. 30, 2015.
Non-Final Office Action dated Jan. 26, 2018, for U.S. Appl. No. 14/686,381, of Renke, C.P., et al., fied Apr. 14, 2015.

* cited by examiner

ANTICIPATORY CREATION OF POINT-OF-SALE DATA STRUCTURES

RELATED APPLICATIONS

This application claims priority to and is a continuation of U.S. patent application Ser. No. 14/871,776, filed on Sep. 30, 2015, and granted on Feb. 14, 2017 as U.S. Pat. No. 9,569,757, the entire contents of which are incorporated herein by reference.

BACKGROUND

Typical point-of-sale (POS) devices used by merchants create relatively simple tickets that document items ordered by customers and payment instruments used by the customers to pay for their items. Typically, an example ticket would track the items ordered by a customer, the cost of the items, and how the customer paid for these items. While these traditional tickets are effective at ensuring that a customer receives what she orders—and is charged as such—they perform very limited functionality.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
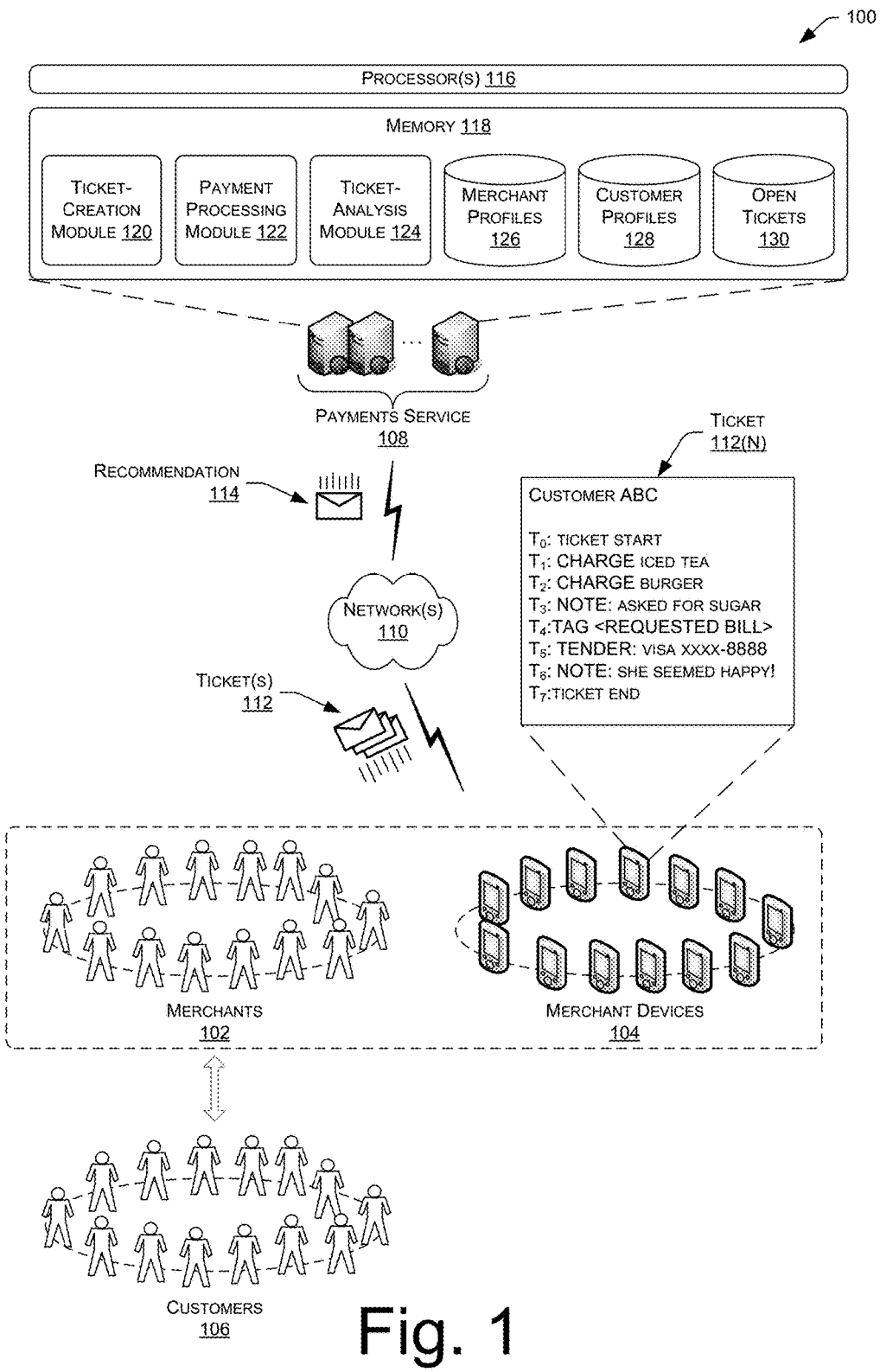
FIG. 1 illustrates an example environment that includes merchants interacting with a community of customers, as well as a payments service that communicates with merchant devices over a network. Within the environment, an example merchant may provide contents of tickets associated with a particular customer to the payments service, which may analyze the tickets and, in response, provide a recommendation back to the merchant for presentation to the particular customer while the particular customer is engaged in a transaction with the merchant.

Some implementations described herein include techniques and arrangements for analyzing previous one or more tickets of a customer at different merchants—specifying interactions of the customer at the different merchants—to determine subsequent recommendations to send to a particular merchant in real-time when the customer or another customer is located at the particular merchant. Next, some implementations described herein include techniques and arrangements to facilitate annotation of merchant tickets by the merchants to enrich the data maintained by the tickets and, in some instances, to enhance the described real-time recommendations. Still other implementations describe creating a merchant ticket for recording interactions between a merchant and customer upon the customer creating a reservation at the merchant for a specified future time, or being added to a waitlist of the merchant. Upon the customer arriving at the merchant proximate to the specified future time, the merchant may use the created ticket to track items ordered by the customers, track tenders used to pay for items, and the like.

In some instances, the tickets described herein may be known as open tickets, which record interactions between customers and merchants. For instance, when a particular customer from a group orders an item from the merchant, the merchant may add this item to the open ticket. When another customer from the group orders another item from the merchant, the merchant may likewise add this item to the open ticket, and may continue doing so until the group is done ordering items. At that point, when one or more customers provide payment (i.e., tenders) to the merchant, the merchant may note the tender(s) used on the open ticket to settle the cost of the ordered items.

As described herein, an open ticket may also record timing of the interactions between the group and the merchant over time. For instance, in the example immediately above, the merchant may note on the open ticket a time at which the particular user from the group ordered the item, a respective time when the other user ordered the additional item, as well as a respective time at which payment was provided. The tickets may note timing in any number of ways. For instance, the tickets may note actual time (i.e., the current time-of-day at which the action occurred) or may note a relative time, such as a sequence in which the interactions occurred or an amount of time that has passed from a predefined event. For instance, when a ticket is created, it may be designated as "time zero" and subsequent interactions may be recorded using timestamps measured from the predefined event. In any of these instances, the ticket may maintain the timing and sequencing of the interactions for later analysis, as described below.

In addition to noting the items ordered and the tenders provided, the open tickets described herein may be annotated by the merchants in a number of ways. For instance, the merchants may provide free-form notes (i.e., free-form text) into the tickets. For instance, the merchants may enter a note describing any data that the merchant believes could be helpful in better serving a customer in this engagement or in future engagements. For instance, the merchant may note a sentiment of the customer as perceived by the merchant (e.g., "she left happy!"), a particular interaction between the merchant and the customer (e.g., "talked about football"), a topic identified as being of interest to the customer (e.g., "seems to really love football"), information related to the customer's preferences (e.g., "she likes her steak *really* rare"), or any other type of information. In one example, different operators or agents of a merchant may use the open tickets as a communication tool. For instance, a server may insert an annotation into the ticket reminding the kitchen to cook a steak as rare as possible as requested by the customer, and this annotation may appear on all merchant devices (or just the merchant device in the kitchen). In another example, a manager may insert an annotation into an open ticket such as "this is a good friend of the business, please offer him a free appetizer."

In addition to entering free-form notes, devices of the merchants maintaining the open tickets may store multiple predefined and selected tags that may be selected by the merchants for association with a particular open ticket (and with a corresponding time at which the merchant selects the tag). Each of these tags may represent a general interaction between a merchant and a customer, such as a generalized sentiment of the customer, a particular interaction between a customer and a merchant regarding an ordered item, and the like. For instance, example tags may include a tag noting that the customer is or was happy (<happy>), a tag noting that the customer was not pleased with the performance of the merchant (<displeased>), a tag noting that the customer accepted a particular item or refill of an item, a tag noting that the customer declined a particular item or refill of an item, a tag noting a topic of interest of the customer, or the like. While free-form notes allow a merchant to enter any type or length of note, they may take longer to enter than tags. Tags, meanwhile, may be limited to the set of pre-stored tags, but may be much quicker to enter than notes. For instance, tags may be selected from a drop-down menu with a single or very few touches on a touch screen, for instance.

Taken together, the open tickets may provide a rich vehicle for determining information about customers for providing subsequent recommendations to merchants regarding the customers. That is, because the open tickets describe rich data (e.g., free-form text and tags), as well as sequences of interactions between the merchants (by noting the time of each interaction), the open tickets may be analyzed to determine certain preferences or habits of particular customers. Thereafter, when one of the particular customers visits a merchant, the merchant may receive an indication of that customer's preferences and habits for better serving the customer.

In some instances, a payments service that functions, in part, to authorize customer payment instruments for the cost of acquired items may receive contents of the open tickets and may perform the analysis. That is, the payment service may work with multiple merchants to approve customer payment instruments as well as store the open tickets for analysis. Based on the analysis, the payments service may store the preferences or habits of individual customers at respective customer profiles at the payments service. Thereafter, when a particular merchant sends an indication to the payments service that a particular customer has begun an engagement with the merchant, the payments service may send certain suggestions/recommendations to the merchant in real-time during the engagement. For instance, in response to the particular merchant sending an indication that it has created a new open ticket for the particular customer, the payments service may send timely recommendations for inclusion in the new open ticket prior to this open ticket being closed (i.e., prior to the customer paying for items acquired from the merchant). These recommendations may range from recommending items at particular times, recommendation refills of items at particular times, recommending when to present the check to the customer, recommending when to inform the customer about the status of an item, recommending topics of interest to discuss with the customer, or the like. Of course, while a few example recommendations are described, it is to be appreciated that the recommendations may be of any other type.

As described above, open tickets track interactions of a customer (or multiple customers part of a common group at the merchant) and a merchant over time. These interactions include items ordered, tenders used, notes added by the merchant, and tags selected by the merchant, as well as timing information noting when each of these events occurred. As such, the open tickets serve as a canonical representation of a transaction between the customer and the merchant.

In some instances, an open ticket may be created prior the customer even arriving at a merchant. For instance, a merchant may create an open ticket upon a customer requesting to create a reservation with the merchant at a specified future time. That is, in response to receiving such a request, a device of the merchant may generate an open ticket that will later be used by the merchant to track interactions with the customer at the specified future time, such as the items ordered by the customer, the tenders used by the customer, and the like. By doing so, each interaction between the customer and the merchant from the time that the customer first expressed an interest in patronizing the merchant (i.e., when the customer requested to create a reservation) to the time at which the customer closes the transaction with the merchant (i.e., when the customer pays and/or when the last item is delivered to the customer) may be noted for subsequent analysis. In other instances, an open ticket may likewise be created when a customer is added to a waitlist of the merchant. As used herein, a reservation may represent a request to engage in a transaction with the merchant a specified future time (e.g., hours, days, weeks, etc. in advance). A waitlist, meanwhile, comprises a list of customers who have typically already arrived at the merchant and are hoping to begin an engagement with the merchant (e.g., be seated at a restaurant, see the next available masseuse) at a next available time. Customers are typically added to a waitlist minutes, or in some cases, hours, in advance of this next available time.

In some instances, when a customer requests to create a reservation or be added to a waitlist of a merchant, the customer may provide information in addition to the desired time of a reservation, such as the party size, name of the customer, dietary restrictions of the customer, tipping preference of the customer, payment instrument for use at the close of the transaction, preferences of the customer, or the like. Upon generating the open ticket for the customer, the device of the merchant may also annotate the open ticket with this additional information for later use by the merchant.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

FIG. 1 illustrates an example environment 100 that includes different merchants 102 operating respective point-of-sale (POS) devices 104 to engage in various transactions respective customers 106. The POS devices 104 may comprise any sort of mobile or non-mobile device that includes an instance of a merchant application that executes on the respective device. The merchant application may provide POS functionality to the POS device 104 to enable the merchant 102 (e.g., an owner, employees, etc.) to accept payments from the customers 106. In some types of businesses, one such POS device 104 may correspond to a store or other place of business of the merchant, and thus, may be a fixed location that typically does not change on a day-to-day basis. In other types of businesses, however, the POS device 104 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between a customer and a merchant. For example, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 104 to process the transaction, such as by inputting (e.g., manually, via a magnetic card reader or an RFID reader, etc.) an identifier associated with the payment instrument. For example, a payment instrument of one of the customers 106 may include one or more magnetic strips for providing card and customer information when swiped in a card reader. On other instances, the payment instrument of the one of the customer may include a chip that is read by the card reader when the card is dipped into the card reader. In other examples, other types of payment cards may be used, such as smart cards having a built-in memory chip, a radiofrequency identification tag, or so forth.

During the transaction, the POS device 104 can determine transaction information describing the transaction, such as the identifier of the payment instrument, an amount of payment received from the customer, the item(s) acquired by the customer, a time, place and date of the transaction, and so forth. The POS device 104 can send the transaction information to a payment service 108 over a network 110, either substantially contemporaneously with the conducting of the transaction (in the case of online transactions) or later when the device 104 is in the online mode (in the case offline transactions).

In an offline transaction, the POS device 104 may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with one of the customers 106, the POS device 104 may provide the stored information to the payment service 108 over the network 110. The network 110 may represent any one or more wired or wireless networks, such as a WiFi network, a cellular network, or the like.

In some instances, the POS devices of the merchants may maintain open ticket data structure on their respective devices, which may record interactions made between a customer and a respective merchant. For instance, the open ticket data structures described herein may be generated and maintained using some or all of the techniques described in U.S. patent application Ser. No. 14/686,381, filed on Apr. 14, 2015 and entitled "Open Ticket Payment Handling with Offline Mode", which is incorporated herein by reference in its entirety.

For instance, when a customer orders an item, the merchant may enter the item into the device, which may update the open ticket data structure to note the ordered item and a time at which the item was ordered. In addition, the merchant may insert free-form notes into the open ticket data structure, such as a note documenting a verbal exchange between the customer and the merchant or a sentiment of the customer as perceived by the merchant. In still other instances, the POS device 104 of the respective merchant 102 may store multiple tags each denoting a respective typical interaction between merchants and customers, such as accepted refill, requested water, requested check, appears happy, appears displeased, or the like. Again, the open ticket data structure may be updated when receiving a free-form note or a tag to indicate a time at which that record was received. In addition, when a customer offers tender to pay for one or more items acquired from the merchant (e.g., cash, a gift card, a check, a credit card, etc.), the merchant may update the open ticket data structure on the device of the merchant to indicate this payment. Again, the POS device may indicate a time at which the payment was received.

Proximate to a merchant and a customer ending an engagement (e.g., after settling a cost of the items and/or after the customer receives the last ordered item), the merchant may provide the contents of the open ticket data structure to the payments service 108 for analysis. As illustrated, multiple merchants may send respective open tickets 112 to the payment service 108 for analysis. The payments service 108 may analyze the items ordered, the tenders used, the notes, the tags, and the respective times and sequences of these interactions represented in the open ticket data structure to determine certain preferences or habits of customers generally or of particular customers. With this information, the payments service 108 may then send timely recommendations 114 to the POS devices of the merchants 104, as described in detail below. In some instances, the merchants send the respective open tickets 112 to the payment service 108 upon closure of the respective open tickets. In other instances, the contents of these tickets may provided as the respective merchant updates the respective ticket. That is, the contents of the ticket as modified on a respective POS device may be synchronized with the contents of the ticket at the payments service 108.

FIG. 1 illustrates an example visual representation of an example open ticket data structure, denoted as "open ticket 112(N)." As illustrated, this open ticket is maintained by a particular POS device 104 associated with one of the merchants 102. In addition, the open ticket 112(N) is associated with an example customer ("Customer ABC"). While the open ticket 112(N) is associated with a single customer, in other instances the open ticket 112(N) may be associated with a group of multiple customers. In either instance, the customer may be identified by the merchant via a payment instrument used, a name provided by the customer to the merchant, or the like.

The example open ticket 112(N) indicates that at a first time ($T_1$) the customer ordered an iced tea. As described above, the time $T_1$—as well as each notation of time in the open ticket 112(N)—may represent an actual time of day, a timestamp representing an amount of time that has passed since the beginning of the ticket, or the like. Returning to the contents of the ticket 112(N), the open ticket illustrates that the example customer ordered a burger at a second time ($T_2$). As used herein, the notation of $T_1$, $T_2$, $T_3$, ... $T_N$, $T_{N+1}$ represent increasing points in time. That is, $T_1$ occurs prior to $T_2$ and the so forth. As such, $T_{N+1}$ occurs at some calculated point in time after $T_N$. In addition, the open ticket includes a free-form note entered by the merchant, indicating that the customer requested sugar. In this example, the open ticket includes the notation "NOTE" to indicate that the annotation represents a free form-note entered by the merchant via a physical keyboard, a soft keyboard, voice recognition technology, or any other type of input device of the POS device.

In some instances, the term "NOTE" may appear on the screen of the POS device, while the corresponding text of the actual note may be stored in the corresponding data structure. Similarly, the term "TAG" may appear on the screen of the POS device, while the text or other information associated with the tag may be stored in the corresponding data structure. In other instances, meanwhile, a note or a tag may additionally or alternatively indicate a particular operator that provided the annotation (e.g., note or tag) or a device upon which the annotation was entered. That is, at a merchant having multiple POS devices, when a note or tag is entered at a first of the POS devices, the note or tag may be synchronized across the multiple POS devices. Further, the note or tag displayed on the open ticket presented on the different devices may indicate that it was entered on the first POS device. In another example, the POS devices distributed through the merchant may be associated different roles at the merchant. For instance, a first POS device may reside at hostess stand of a restaurant, a second POS device may reside in a kitchen of the restaurant, and a third POS device may used by a server (i.e., waiter or waitress) of the restaurant. Therefore, when a note is input in the first device, it may appear on the open ticket as "HOST: <contents of note/tag>". Similarly, when a note is input in the second device, it may appear on the open ticket as "Kitchen: <contents of note/tag>". In addition, when a note is input in the third device, it may appear on the open ticket as "server: <contents of note/tag>". Therefore, when this information is synchronized to and presented on the different devices throughout the merchant, the source of the annotation is clear. In still other instances, individual operators may log into the devices. In these instances, the name or other identifier of the operator may appear on the open ticket in association with annotations entered by the operator (e.g., "John: <contents of note/tag>", "Suzy: <contents of note/tag>").

In addition the free-form note entered by the merchant, the open ticket 112(N) indicates that the merchant selected a predefine tag "<Requested Bill>", indicating that a fourth time ($T_4$) the customer requested the bill from the merchant. Further, the open ticket 112(N) indicates that at a fifth time ($T_5$) the customer provided a payment instrument to settle a cost of the ordered items, and lastly includes an example note provided by the merchant indicating that the customer seemed happy.

After closure of the open ticket 112(N) (or as part of the payment authorization request), the example POS device may provide the contents of the example open ticket to the payments service 108. The payments service 108 may analyze these contents to determine any preferences or habits or customers generally and/or of the example Customer ABC. By doing so, the next time that the example customer visits the same merchant or another merchant that communicates with the payments service 108, the payments service 108 may provide a real-time recommendation to the merchant.

As illustrated, the payment service 108 may include one or more processors 116 and memory 118, which may store a ticket-creation module 120, a payment processing module 122, a ticket-analysis module 124, merchant profiles 126 corresponding to respective merchants, customer profiles 128 corresponding to respective customers, and open tickets 130 containing contents of prior open tickets. The ticket-creation module 120 may trigger creation of an open ticket based on any one of multiple triggers. In one particular example, when a customer requests to create a reservation at a particular merchant, the ticket-creation module 120 may send an indication to a device of a merchant indicating the details of the reservation request. In response, the device of the merchant may generate an open ticket for recording subsequent interactions between the customer and the merchant, as described in detail below.

The ticket-analysis module 124, meanwhile, may function to receive open tickets, store them in the data store 130, and analyze the open tickets to determine preferences and/or habits of customers. For instance, and as described in further detail below, the ticket-analysis module 124 may analyze the items ordered, the notes and tags within the open tickets, and the timing of these events to determine these preferences and habits. In instances where a particular analysis is associated with a particular customer, the ticket-analysis module 124 may store this determined preference or habit in association with the corresponding customer profile in the data store 128. By doing so, when a merchant later indicates to the payment service 108 that the particular customer is at the merchant, the ticket-analysis module 124 may send real-time recommendations to a device of the merchant while the customer remains at the merchant. In some instances, when a POS device of the merchant generates a new open ticket for the particular customer, the POS device may send an indication of this new ticket to the payment service 108, which may determine that the customer is at the merchant using this information. In other instances, the customer may "check in" at the merchant or may make her presence known to the merchant in any other suitable manner, such that the payment service 108 is able to provide the real-time recommendations to the merchant while the customer remains at the merchant.

The payment processing module 122, meanwhile, may function to receive the information regarding a transaction from the POS device 104 and attempt to authorize the payment instrument used to conduct the transaction. The payment processing module 122 may then send an indication of whether the payment instrument has been approved or declined back to the POS device 104.

Generally, when a customer and a merchant enter into an electronic payment transaction, the transaction is processed by electronically transferring funds from a financial account associated with the customer to a financial account associated with the merchant. As such, the payment processing module 122 may communicate with one or more computing devices of a card payment network, e.g., MasterCard®, VISA®, over the network 110 to conduct financial transactions electronically. The payment processing module 122 can also communicate with one or more computing devices of one or more banks over the network 110. For example, the payment processing module 122 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

Figure 2A:
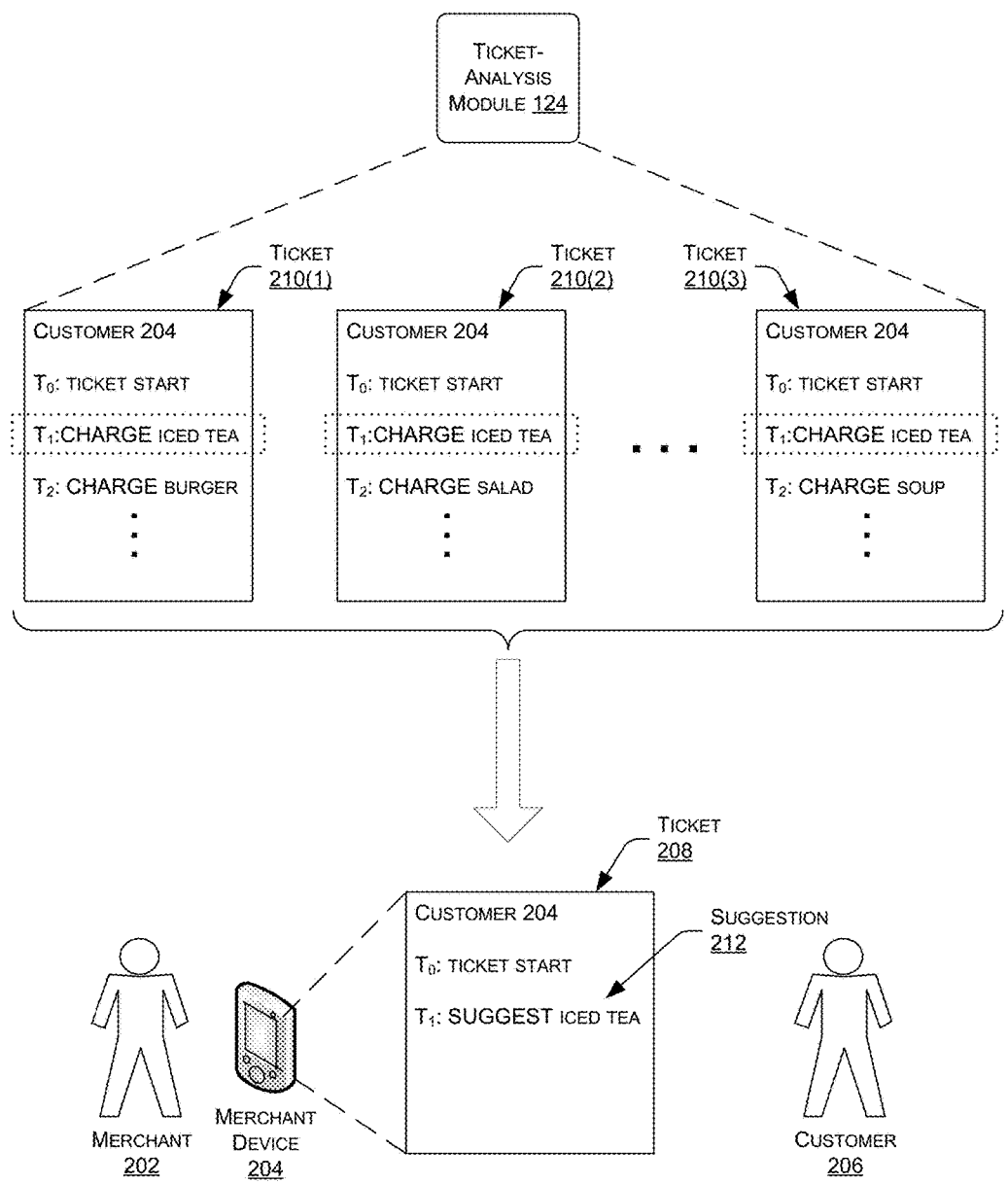
FIG. 2A illustrates an example scenario where a ticket-analysis module determines, based on analysis of prior tickets associated with a customer, that a merchant interacting with the customer should consider offering the customer a particular item.

FIG. 2A illustrates an example scenario where the ticket-analysis module 124 determines, based on analysis of prior tickets associated with a customer 206, that a merchant 202 interacting with the customer 206 should consider offering the customer 206 a particular item. As illustrated, the ticket-analysis module 124 has received multiple completed open tickets 210(1), 210(2), and 210(3) associated with the example customer 206 ("Customer ABC"). In some instances, the ticket-analysis module 124 may classify merchants by type (e.g., restaurants, clothing retail, professional services, etc.) and may perform its analysis across tickets of these types. That is, the ticket-analysis module 124 may determine certain preferences or habits of the customer 206 for merchants classified as restaurants, for merchants classified as clothing retail, and the like. Further, while the following discussion describes the module 124 of the payments service 108 issuing suggestions, in other instances an operator of the merchant (e.g., a manager) may utilize a merchant POS device to manually insert these suggestions (or other communications) into the tickets.

In the illustrated example, the ticket-analysis module 124 has identified that the customer 206 has begun each respective order at a restaurant by ordering an iced tea. Therefore, upon receiving an indication that the customer 206 is present at the merchant 202 (also classified as a restaurant), the ticket-analysis module 124 sends a suggestion 212 to a POS device of the merchant 202, for inclusion in a current open ticket 208 associated with the customer 206, suggesting that the merchant 202 suggest an iced tea to the customer 206. Further, the ticket-analysis module may send this suggestion to the merchant 202 at a time corresponding to when the customer 206 typically orders the iced tea—at the beginning of his meal. Further, while FIG. 2A describes the ticket-analysis module 124 analyzing tickets associated with one customer for making an item recommendation for the same customer, in other implementations the module 124 may make this recommendation using additional and/or different tickets. For instance, the module 124 may analyze tickets associated with other customers determined to have similar ordering tendencies as the customer 206, similar demographic traits as the customer 206, or the like.

Figure 2B:
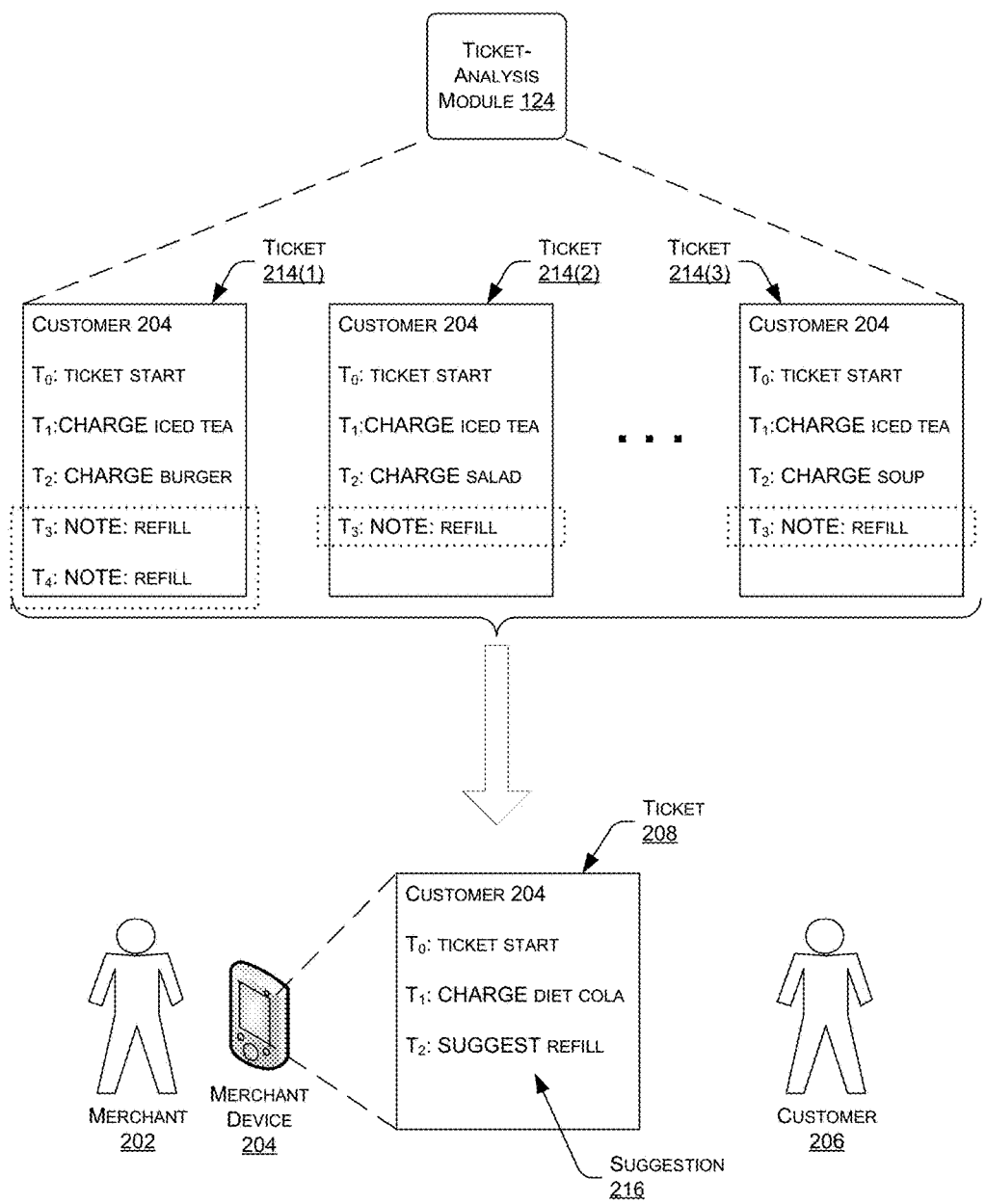
FIG. 2B illustrates an example scenario where the ticket-analysis module determines, based on analysis of prior tickets associated with a customer, that a merchant interacting with the customer should consider offering the customer another instance of a particular item ordered by the customer.

FIG. 2B illustrates an example scenario where the ticket-analysis module 124 determines, based on analysis of prior tickets 214(1), 214(2), and 214(3) associated with the customer 206, that the merchant 202 interacting with the customer 206 should consider offering the customer another instance of a particular item ordered by the customer. As shown, the ticket-analysis module 124 has identified that in each of the three past tickets 214(1)-(3) the customer 206 has requested a refill of her iced tea. As such, sometime after the customer 206 orders a beverage from the merchant 202, the ticket-analysis module 124 may send a suggestion 216 to the POS device 204 of the merchant 202 suggesting that the merchant 202 proactively offer a refill to the customer 206. That is, having identified that the customer 206 often requests another instance of the previously ordered item, the module 124 may recommend that the merchant proactively offer the additional instance prior to the customer 206 requesting it. Further, while FIG. 2B describes the ticket-analysis module 124 analyzing tickets associated with one customer for making a recommendation for an additional instance of an item ordered by the same customer, in other implementations the module 124 may make this recommendation using additional and/or different tickets. For instance, the module 124 may analyze tickets associated with other customers determined to have similar ordering tendencies as the customer 206, similar demographic traits as the customer 206, or the like.

Figure 2C:
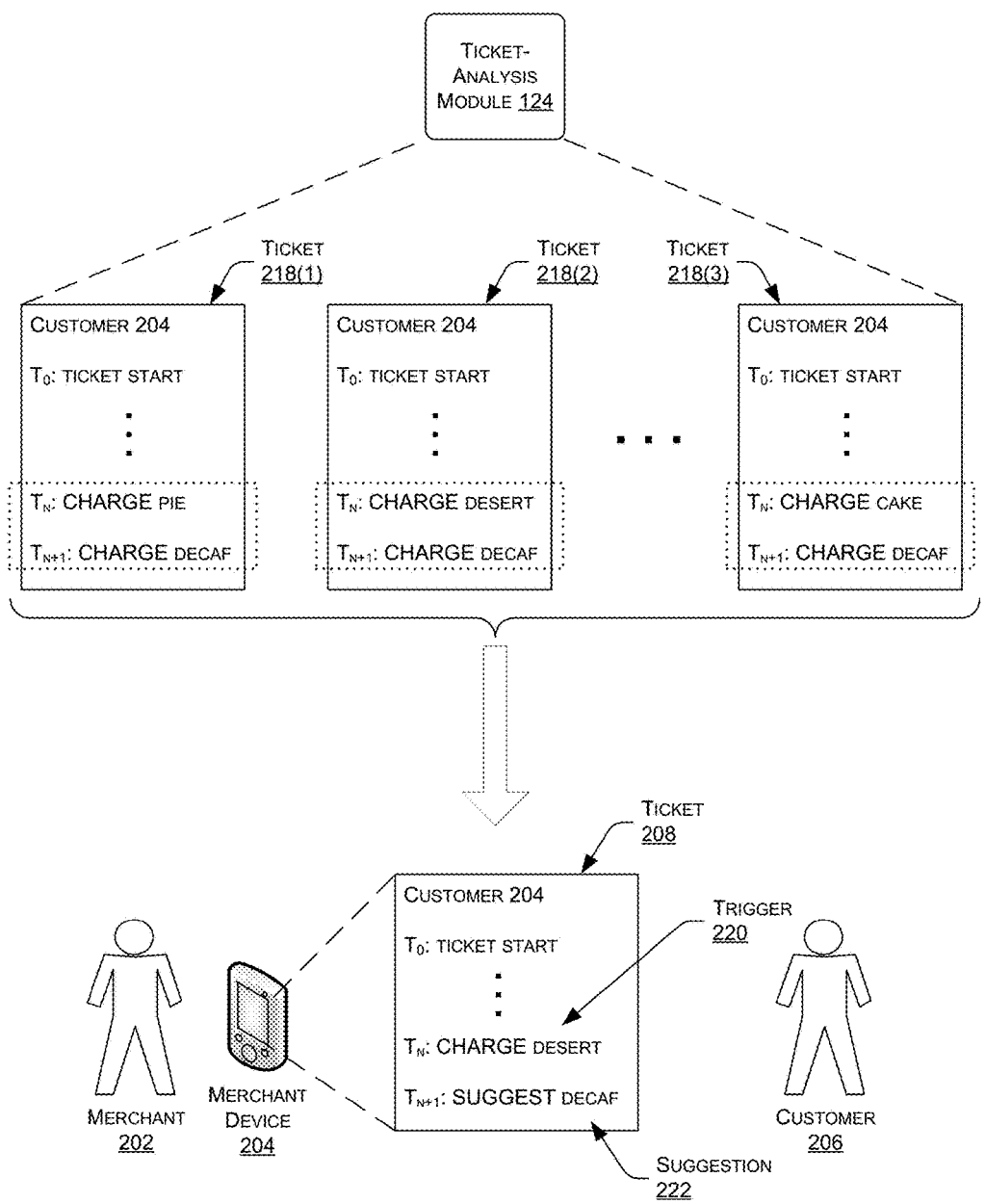
FIG. 2C illustrates an example scenario where a ticket-analysis module determines, based on analysis of prior tickets associated with a customer, that a particular customer often orders a particular item after ordering an item of a particular type. As such, in response to the ticket-analysis module identifying that the customer has again ordered an item of the particular type, the module suggests that the merchant interacting with the customer should consider offering the customer the particular item that the customer often orders thereafter.

FIG. 2C illustrates an example scenario where the ticket-analysis module 124 determines, based on analysis of prior tickets 218(1), 218(2), and 218(3) associated with the customer 206, that the customer 206 often orders a particular item after ordering an item of a particular type. As such, in response to the ticket-analysis module 124 identifying that the customer 206 has again ordered an item of the particular type, the module 124 suggests that the merchant 202 interacting with the customer 206 should consider offering the customer 206 the particular item that the customer 206 often orders thereafter.

In this particular example, the module 124 analyzes the prior tickets 218(1)-(3) to determine that the customer 206 often orders a decaffeinated coffee after ordering an item classified as "desert". As such, when the module 124 receives, from the POS device 204 that the customer 206 has again ordered a desert item, the indication acts a trigger 220 to cause the module 124 may send, to the POS device 204 and for inclusion in the current ticket 208 associated with the customer, a suggestion 222 that the merchant offer decaf coffee to the customer 206. Further, while FIG. 2C describes the ticket-analysis module 124 analyzing tickets associated with one customer for making an item recommendation for the same customer, in other implementations the module 124 may make this recommendation using additional and/or different tickets. For instance, the module 124 may analyze tickets associated with other customers determined to have similar ordering tendencies as the customer 206, similar demographic traits as the customer 206, or the like. For example, the module 124 may identify, generally across customers, what items customers often order (e.g., coffee) after a particular item (e.g., desert).

Figure 2D:
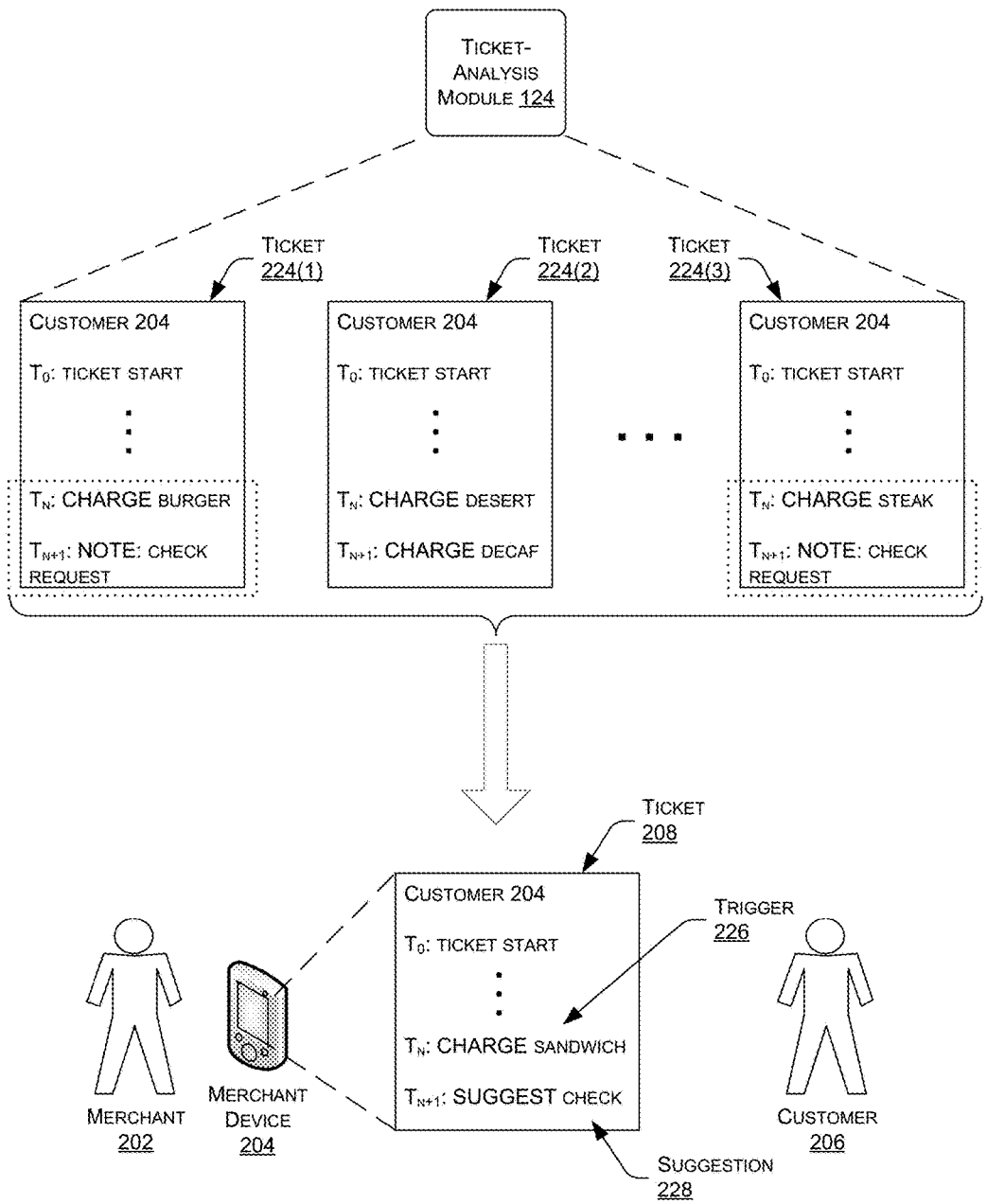
FIG. 2D illustrates an example scenario where a ticket-analysis module determines, based on analysis of prior tickets associated with a customer, that a customer often requests a bill from a merchant after ordering a particular type of item. As such, in response to the module identifying that the customer has again ordered this type of item, the module suggests that the merchant interacting with the customer consider offering the customer her bill.

FIG. 2D illustrates an example scenario where a ticket-analysis module 124 determines, based on analysis of prior tickets 224(1), 224(2), and 224(3) associated with the customer 206, that the customer 206 often requests a bill from a merchant after ordering a particular type of item. As such, in response to the module 124 identifying that the customer 206 has again ordered this type of item, the module 124 suggests that the merchant 202 interacting with the customer 206 consider offering the customer 206 her bill.

In this example, the ticket-analysis module 124 determines, from the prior tickets 224(1)-(3), that the customer 206 often requests a bill (or "check") from a merchant some amount of time after ordering her entrée. As such, when module 124 receives an indication that the customer 206 has again ordered her entrée (at $T_N$), this indication acts as a trigger 226 to send a suggestion 228 to the POS device 204 of the merchant 202 to offer the bill to the customer proactively, potentially specifying a time at which to do so (here, $T_{N+1}$, which is a calculated amount of time after the ordering of the entrée at $T_N$). Further, while FIG. 2D describes the ticket-analysis module 124 analyzing tickets associated with one customer for making a recommendation for a bill for the same customer, in other implementations the module 124 may make this recommendation using additional and/or different tickets. For instance, the module 124 may analyze tickets associated with other customers determined to have similar ordering tendencies as the customer 206, similar demographic traits as the customer 206, or the like.

Figure 3:
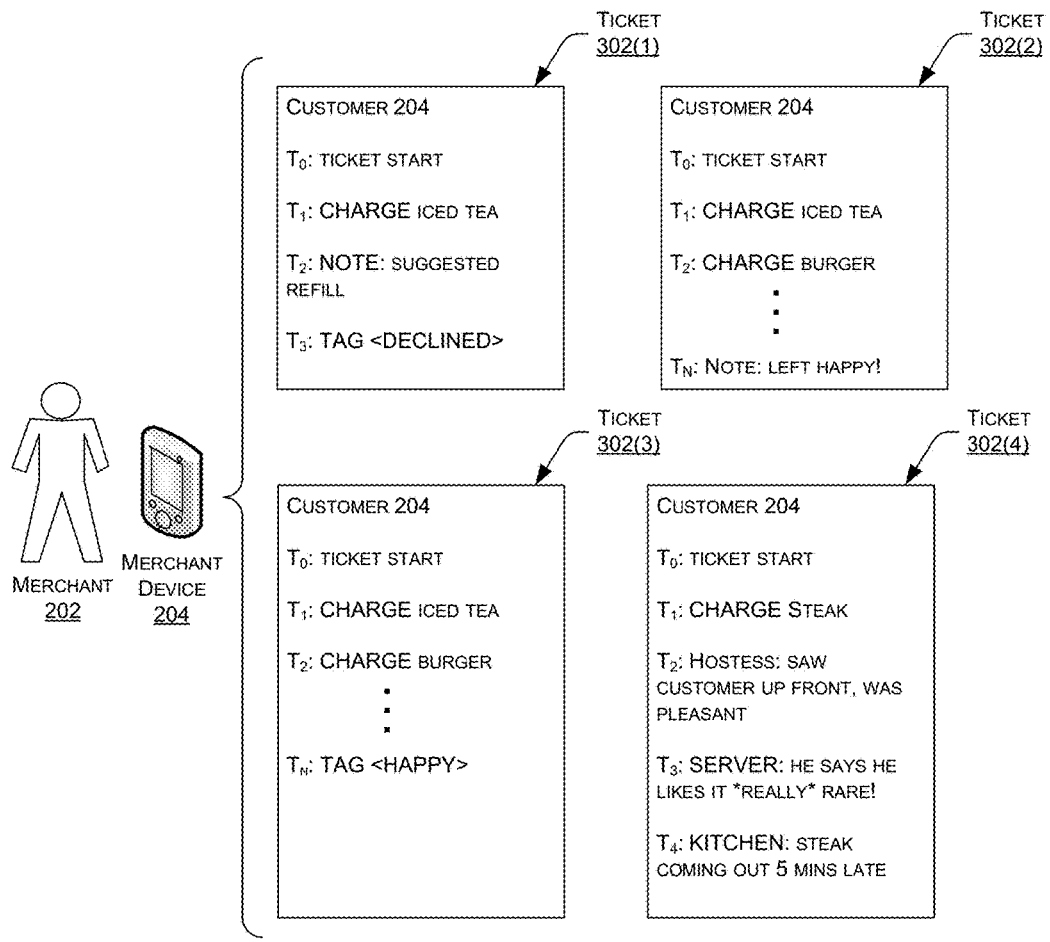
FIG. 3 illustrates example annotations that a merchant may place into a ticket structure to enhance customer experiences at the merchant.

FIG. 3 illustrates a series of example open tickets 302(1), 302(2) 302(3), and 302(4), each of which illustrates one or more different example types of annotation that a merchant may place into a ticket structure to enhance customer experiences at the merchant. While FIG. 3 illustrates these examples in the context of a common customer, it is to be appreciated that these annotations may appear across any number of different customers and may be entered by an array of different merchants.

First, the open ticket 302(1) indicates, at a second time ($T_2$), a note entered by the merchant, indicating that the merchant offered some type of refill to the customer. In addition, the open ticket 302(1) indicates, via a tag selected by the merchant at a third time ($T_3$), that the customer declined. The second open ticket 302(2), meanwhile, indicates, at the end of the ticket 302(2), that merchant left a note indicating that the merchant believed that the merchant left happy. Conversely, the third open ticket 302(3) indicates that the merchant selected a predefined tag indicating that the merchant appeared happy.

In some instances, different operators within a merchant may enter notes or select tags for inclusion in open tickets, with these notes and tags being propagated to different devices associated with the merchant Using a restaurant as an example, for instance, a hostess stand may include a merchant device, while a server may utilize a POS device to enter orders into the system, while the kitchen may include yet another merchant device, in this case a Kitchen Display System ("KDS") device that receives the orders and indicates that the food items to be prepared. Within this context, the fourth example open ticket 302(4) indicates a second time ($T_2$) that a host or hostess entered, via the device at the hostess stand, a note indicating that the hostess saw the customer near the front of the facility and had a pleasant exchange. That is, in this example the open ticket 302(4) is used as a communication channel between different operators within a common merchant, such that the hostess is able to provide certain information to other merchant operators, such as the waiter or waitress viewing the POS device. Additionally or alternatively, a manager may communicate with her employees by adding annotations to the open tickets.

Furthermore, the fourth open ticket 302(4) also indicates that a server has utilized a POS device to indicate to the kitchen that the customer likes her steak very rare. That is, because the server utilizing the POS device added the note, the open ticket 302(4) may indicate that the "server" (or waiter/waitress) entered the note. Further, this free-form text may be synchronized across the devices of the merchant (as discussed above), including to the device of the merchant in the kitchen, such that the kitchen is able to receive pertinent information from the server. Additionally, the open ticket 302(4) also indicates that an operator of the merchant located in the kitchen may utilize the merchant device in the kitchen (e.g., the KDS) to provide information to other merchant operators, such as the server. Here, for instance, the open ticket 302(4) has been annotated to indicate that the steak is running five minutes late. Upon viewing this note on the POS device, the server may inform the customer accordingly. Therefore, the open ticket 302(4) illustrates how a merchant may annotate a common open ticket using multiple different devices, with these annotations being synchronized across the devices to serve as an internal communication tool of the merchant.

Figure 4:
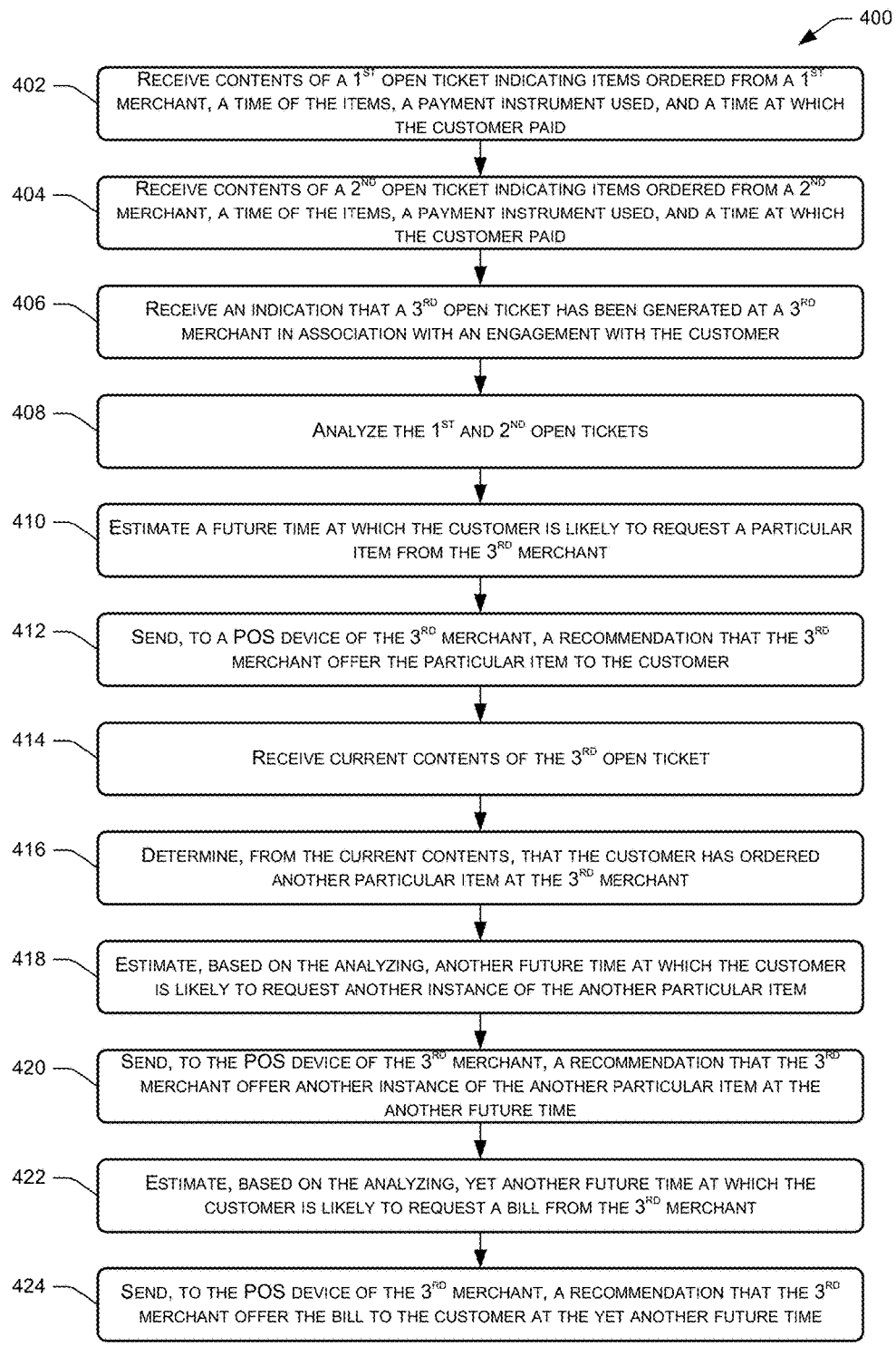
FIG. 4 illustrates a flow diagram of an example process for analyzing past tickets of a customer to determine suggestions to later provide to the customer, in real-time while the customer engages in a transaction within a merchant.

FIG. 4 illustrates a flow diagram of an example process 400 for analyzing past tickets of a customer to determine suggestions to later provide to the customer, in real-time while the customer engages in a transaction within a merchant. The process 400 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 400 may be performed by a POS device, by a remote payments service, by another entity, or by a combination thereof.

At 402, the process 400 receives contents of a first open ticket data structure stored on a POS device of a first merchant, the contents of the first open ticket data structure indicating: (i) a first set of items ordered by a particular customer from the first merchant, (ii) for each item of the first set of items, a time at which the particular customer ordered the respective item from the first merchant, (iii) a payment instrument used by the particular customer to pay for the first set of items, and (iv) a time at which the particular customer used the first payment instrument to pay for the first set of items. Similarly, at 404 the process 400 receives contents of a second open ticket data structure stored on a POS device of a second merchant, the contents of the second open ticket data structure indicating: (i) a second set of items ordered by the particular customer from the second merchant, (ii) for each item of the second set of items, a time at which the particular customer ordered the respective item from the second merchant, (iii) a payment instrument used by the particular customer to pay for the second set of items, and (iv) a time at which the particular customer used the payment instrument to pay for the second set of items.

At 406, the process 400 receives an indication that a third open ticket data structure has been generated on a POS device of a third merchant in association with an engagement between the third merchant and the particular customer. For instance, the POS device of the third merchant may have opened a ticket in association with an identifier of the customer or the customer may have checked in at the merchant. At 408, the process 400 analyzes the first open ticket data structure and the second open ticket data structure. Based on the analyzing, at 410 the process 400 estimates a future time at which the particular customer is likely to request a particular item from the third merchant. For instance, the process 400 may determine that the user often orders a particular item upon arriving at a merchant, upon ordering another type of item, or the like. At 412, the process 400 sends, to the POS device of the third merchant, a recommendation that the third merchant offer the particular item to the particular customer at the future time.

At 414, meanwhile, the process 400 receives current contents of the third open ticket data structure. At 416, the process 400 determines, from the current contents of the third open ticket data structure, that the particular customer has ordered another particular item from the third merchant. At 418, the process 400 estimates, based at least in part on the analyzing, another future time at which the particular customer is likely to request another instance of the another particular item from the third merchant. For instance, the process 400 may determine that a certain amount of time after ordering a drink, the customer often requests a refill. At 420, the process sends, to the POS device of the third merchant, a recommendation that the third merchant offer another instance of the another particular item to the particular customer at the another future time.

At 422, meanwhile, the process 400 also estimates, based at least in part on the analyzing, yet another future time at which the particular customer is likely to request a bill for a cost of items ordered from the third merchant That is, the process 400 may determine how long a customer generally stays at a merchant before requesting a bill for the items ordered. Based on this estimation, at 424 the process 400 sends, to the POS device of the third merchant, a recommendation that the third merchant offer the bill to the particular customer at the yet another future time. By proactively providing this to the customer at a time when she typically requests it, the experience of the customer at the merchant may be enhanced.

Figure 5:
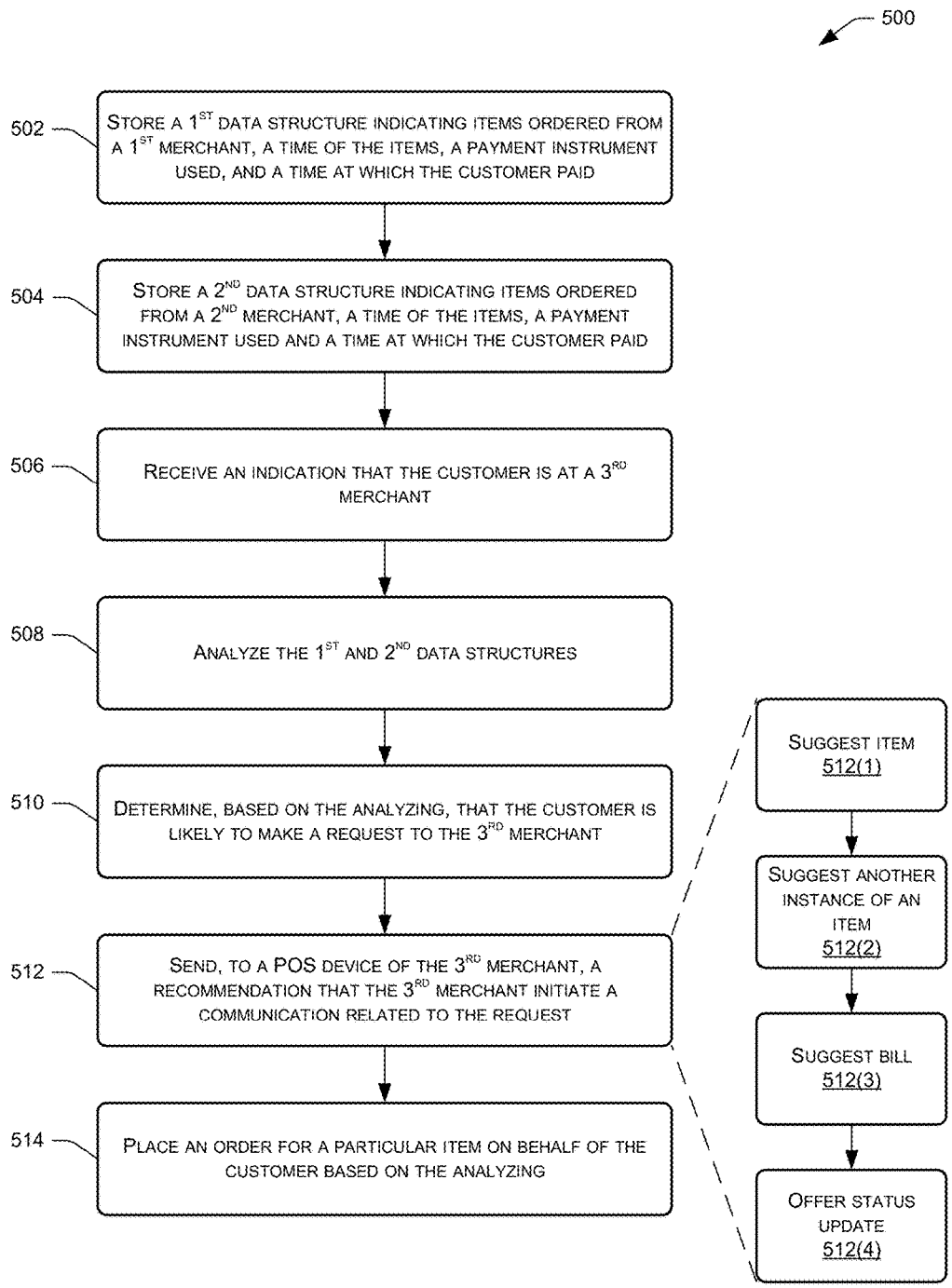
FIG. 5 illustrates a flow diagram of another example process for analyzing past tickets of a customer to determine suggestions to later provide to the customer, in real-time while the customer engages in a transaction within a merchant.

FIG. 5 illustrates a flow diagram of another example process 500 for analyzing past tickets of a customer to determine suggestions to later provide to the customer, in real-time while the customer engages in a transaction within a merchant. At 502, the process 500 stores a first data structure indicating: (i) a first set of items ordered by a particular customer from a first merchant, (ii) for each item of the first set of items, a time at which the particular customer ordered the respective item from the first merchant, (iii) a payment instrument used by the particular customer to pay for the first set of items, and (iv) a time at which the particular customer used the first payment instrument to pay for the first set of items. At 504, the process 500 stores a second data structure indicating: (i) a second set of items ordered by the particular customer from a second merchant, (ii) for each item of the second set of items, a time at which the particular customer ordered the respective item from the second merchant, (iii) a payment instrument used by the particular customer to pay for the second set of items, and (iv) a time at which the particular customer used the payment instrument to pay for the second set of items.

At 506, the process 500 receives an indication that the particular customer is currently engaging in a transaction at a third merchant Again, the $3^{rd}$ merchant may provide this indication or the customer herself may provide this indication. At 508, the process 500 analyzes the first data structure and the second data structure and, based on this analyzing, determines, at 510, that the particular customer is likely to make a request to the third merchant. At 512, the process 500 sends, to a POS device of the third merchant, a recommendation that the third merchant initiate a communication related to the request with the particular customer. For instance, the process 500 may send a recommendation to suggest a particular item (512(1)), to suggest another instance of a previously ordered item (512(2)), to suggest the bill to the customer (512(3)), to offer a status update regarding an item ordered by the customer (514(4)), or the like. Finally, at 514, the process 500 may place an order for a particular item to the third merchant on behalf of the particular customer based at least in part on the analyzing. For instance, if the process 500 determines that the customer nearly always orders coffee with desert, the process 500 may proactively order the item on behalf of the customer rather than simply make this suggestion to the customer. Of course, upon receiving the coffee, the customer may accept or refuse the automatically ordered item.

Figure 6A:
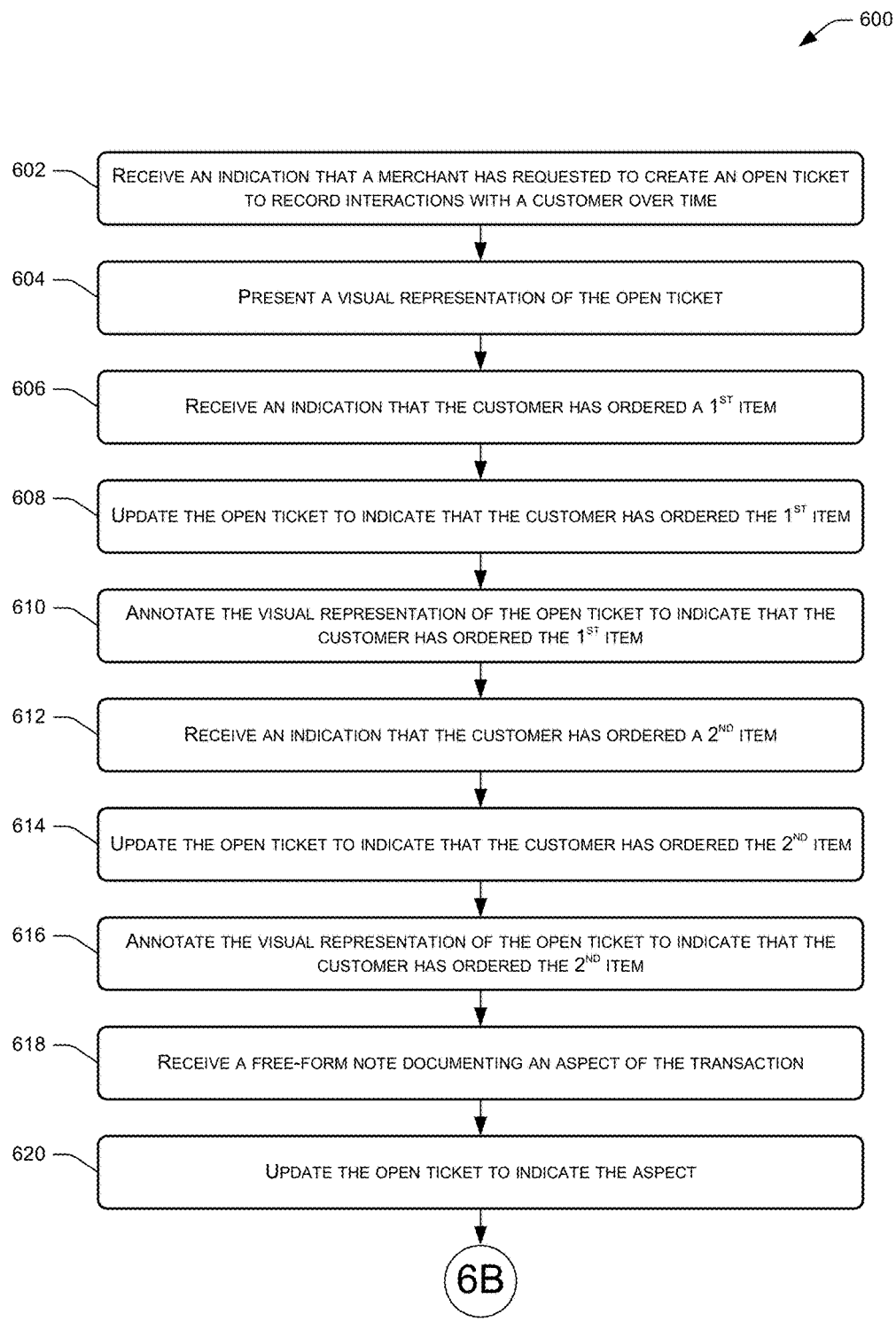
FIGS. 6A-6B collectively illustrate a flow diagram of an example process for annotating a ticket.
Figure 6B:
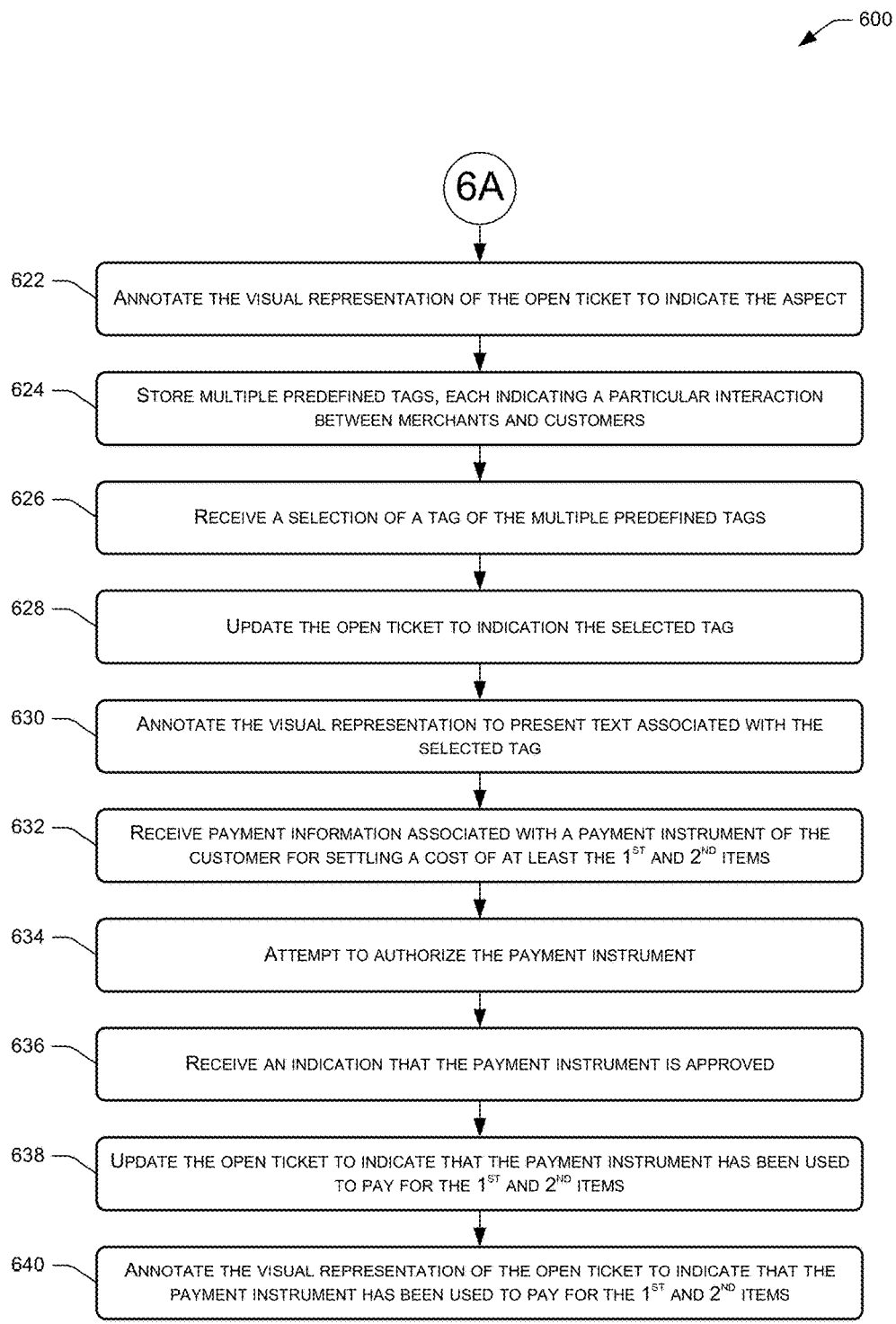

FIGS. 6A-6B collectively illustrate a flow diagram of an example process 600 for annotating an open ticket data structure. At 602, the process 600 receives an indication that the merchant has requested to create an open ticket data structure to record interactions made over time between the merchant and the customer of the merchant. At 604, the process 600 presents, on a display of a POS device of the merchant, a visual representation of the open ticket data structure. At 606 the process 600 receives an indication that the customer has ordered a first item from the merchant. For instance, the merchant may enter this order into the POS device using any suitable input device of the POS device, such as a physical keyboard, a soft keyboard, a touch screen, a mouse and cursor, voice recognition technology, or the like.

At 608, the process 600 updates the open ticket data structure to indicate that the customer has ordered the first item. At 610, the process 600 annotates the visual representation of the open ticket data structure on the display to indicate that the customer has ordered the first item. That is, details regarding the first item may be visually presented, such as a name of the first item, a time at which it was ordered, a cost of the first item, and the like. At 612, the process 600 receives an indication that the customer has ordered a second item from the merchant and, at 614, updates the open ticket data structure to indicate that the customer has ordered the second item. At 616, the process 600 annotates the visual representation of the open ticket data structure on the display to indicate that the customer has ordered the second item.

At 618, the process 600 receives a free-form note provided by the merchant, the free-form note documenting an aspect of the transaction or engagement between the merchant and the customer. That is, the documented aspect may note a verbal exchange between the merchant and the customer, a note made by the merchant regarding a perceived sentiment of the customer, a note by the merchant as a reminder to his or herself, or any other note related to the transaction. At 620, the process 600 updates the open ticket data structure to indicate the aspect of the transaction. As described above, this information may later be used when analyzing open tickets to determine preferences and/or habits of the customer.

FIG. 6B continues the illustration of the process and includes, at 622, updating the visual representation of the open ticket data structure on the display to indicate the aspect of the transaction.

An operation 624, meanwhile, represents the process 600 storing multiple predefined tags for selection, each of the multiple predefined tags indicating a particular interaction between merchants and customers. That is, the POS device may be configured to include multiple different tags that denote common interactions between merchants and customers, such as whether the customer accepted or declined an offer, whether the customer appeared pleased or displeased, whether the customer had dietary restrictions, or the like. At 626, meanwhile, the process 600 receives a selection of a tag of the multiple predefined tags and, at 628, updates the open ticket data structure to indicate the selected tag. At 630, the process 600 annotates the visual representation of the open ticket data structure on the display to present text associated with the selected tag.

At 632, potentially near the close of the engagement between the customer and the merchant, the process 600 receives, from a card reader of the POS device, payment information associated with the payment instrument of the customer, the payment information for settling a cost of the first and second items. At 634, the process 600 attempts to authorize the payment instrument for the cost of the first and second items using the payment information. At 636, the process 600 receives an indication that the payment instrument has been approved for the cost of the first and second items and, at 638, updates the open ticket data structure to indicate that the payment instrument has been used to settle the cost of the first and second items. Finally, at 640, the process 600 annotates the visual representation of the open ticket data structure on the display to indicate that the payment instrument has been used to settle the cost of the first and second items. That is, details regarding the cost of the transaction and/or the payment instrument (e.g., the last four numbers, identification of card network, etc.) may be visually presented.

Figure 7A:
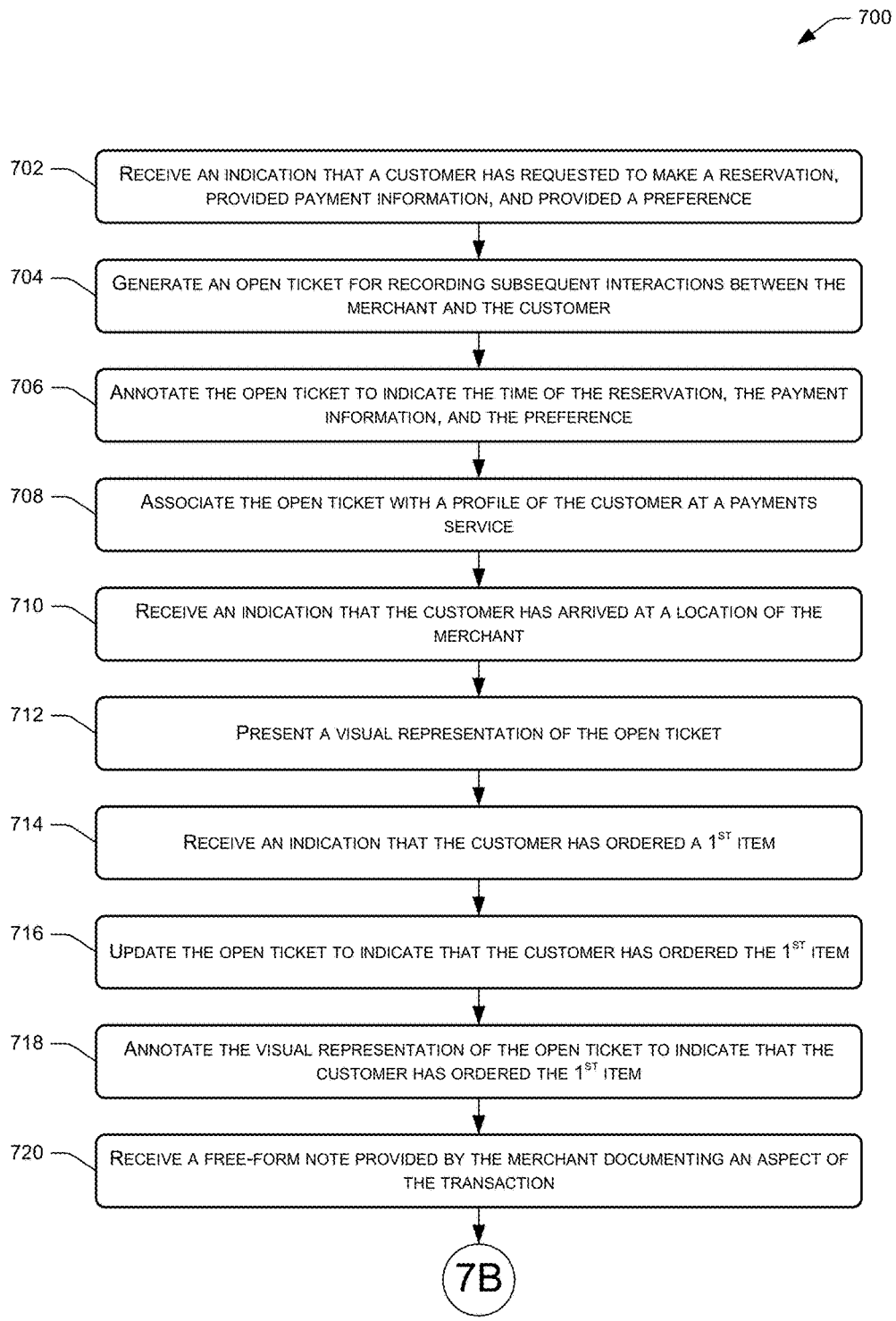
FIGS. 7A-7B collectively illustrate a flow diagram of an example process for generating a ticket data structure in response to a customer making a reservation with a merchant for a later time.
Figure 7B:
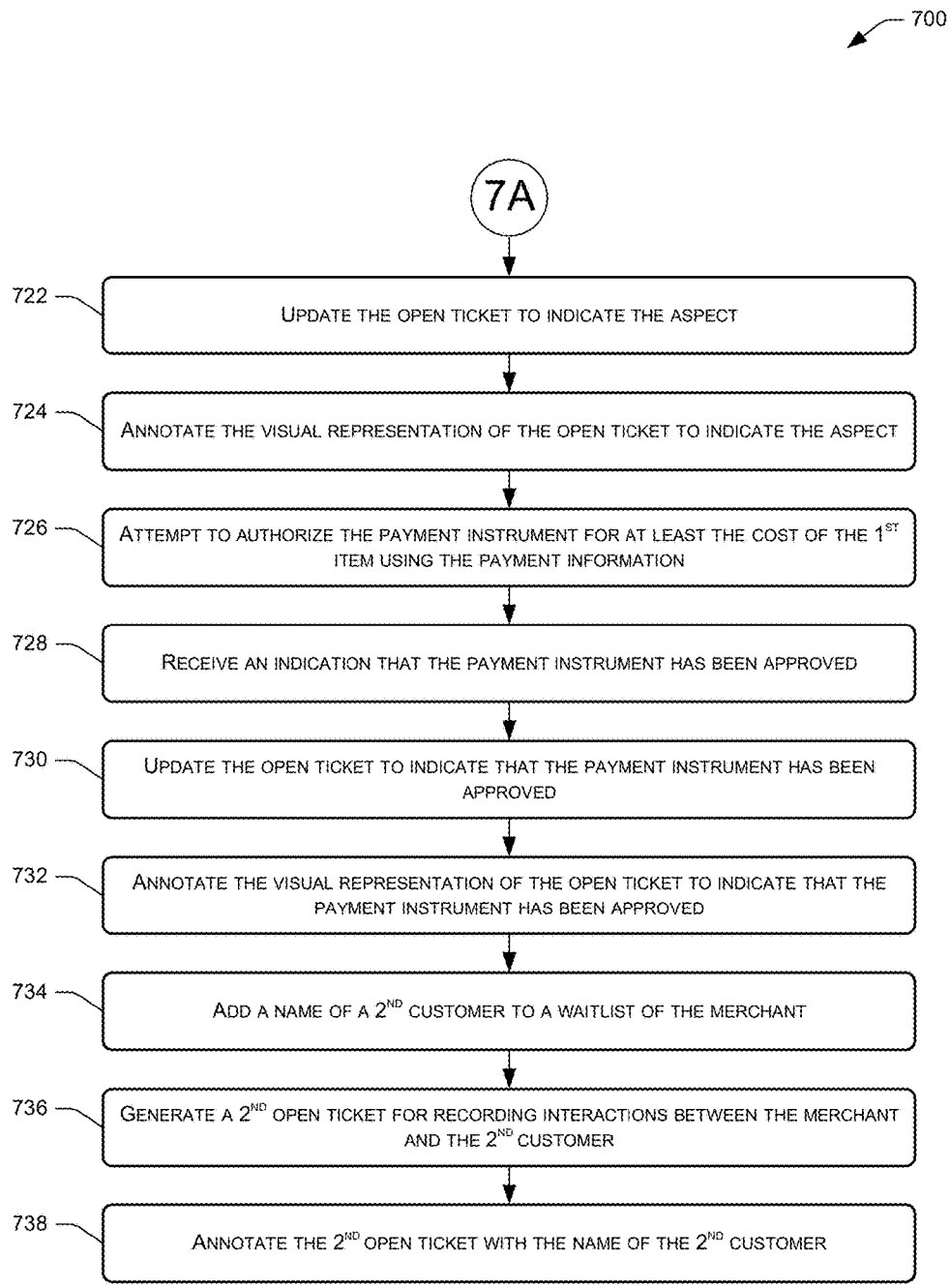

FIGS. 7A-7B collectively illustrate a flow diagram of an example process 700 for generating a ticket data structure in response to a customer making a reservation with a merchant for a later time. At 702, the process 700 receives an indication that the customer has: (i) requested to make a reservation with the merchant at a specified future time, (ii) provided payment information associated with the payment instrument of the customer for use at the merchant to settle a subsequent cost associated with one or more items obtained from the merchant by the customer during the reservation, and (iii) provided a preference of the customer. At 704, the process 700, at a time of receiving the request, an open ticket data structure for recording interactions between the merchant and the customer at least before and during the specified future time of the reservation. At 706, the process annotates the open ticket data structure to indicate: (i) that the reservation is at the specified future time, (ii) the payment information for use at the merchant to settle the subsequent cost associated with the one or more items obtained from the merchant by the customer during the reservation, and (iii) the preference of the customer. In addition, at 708 the process 700 may associate a profile of the customer at a payments service with the open ticket data structure, with the profile identifying at least one of a tipping preference of the customer, a dietary restriction of the customer, or an item preferred by the customer. Again, the open ticket data structure may be annotated with this information.

Sometime thereafter, at 710, the process 700 receives, proximate to the specified future time, an indication that the customer has arrived at a location of the merchant. At 712, the process 700 presents, on a display of the POS device and proximate to the specified future time, a visual representation of the open ticket data structure. At 714, the process 700 receives, from an input device of the POS device, an indication that the customer has ordered a first item from the merchant and, at 716, updates the open ticket data structure to indicate that the customer has ordered the first item. At 718, the process 700 annotates the visual representation of the open ticket data structure on the display to indicate that the customer has ordered the first item. At 720, the process 700 receives, from the input device, a free-form note provided by the merchant, the free-form note documenting an aspect of the transaction or engagement between the merchant and the customer. That is, the documented aspect may note a verbal exchange between the merchant and the customer, a note made by the merchant regarding a perceived sentiment of the customer, a note by the merchant as a reminder to his or herself, or any other note related to the transaction.

FIG. 7B continues the illustration of the process 700 and includes, at 722, updating the open ticket data structure to indicate the documented aspect. At 724, the process 700 also annotates the visual representation of the open ticket data structure on the display to indicate the documented aspect. That is, text documenting the aspect (e.g., "had a good conversation with the customer", "customer likes desert", "don't forget to tell kitchen to cook it really well") may be visually presented on the open ticket.

At 726, meanwhile, the process 700 attempts to authorize the payment instrument of the customer for at least the cost of the first item using the payment information, which was received at the time of the customer making the reservation in this example. At 728, the process 700 receives an indication that the payment instrument has been approved for the cost of the first item and updates the open ticket data structure to indicate that the payment instrument has been used to settle at least the cost of the first item at 730. At 732, the process 700 annotates the visual representation of the open ticket data structure on the display to indicate that the payment instrument has been used to settle at least the cost of the first item.

At 734, meanwhile, the process 700 adds a name of a second customer to a waitlist maintained on the POS device. Again, similar to the discussion of the reservation of the first customer again, adding the second customer to the waitlist may trigger creation of an open ticket data structure that may be used to record interactions between the merchant and second customer. At 736, the process 700 generates, proximate to the time at which the second customer was added to the waitlist, a second open ticket data structure for recording interactions between the merchant and the second customer. Finally, at 738, the process 700 annotates the second open ticket data structure with the name of the second customer, potentially along with any other information provided by the customer, such as payment information, dietary restrictions, preferences, or the like. The merchant may then use the second open ticket data structure to place item orders for the second customer, add annotations (e.g., notes and tags), and add tenders of the second customer for settling the bill.

Figure 8:
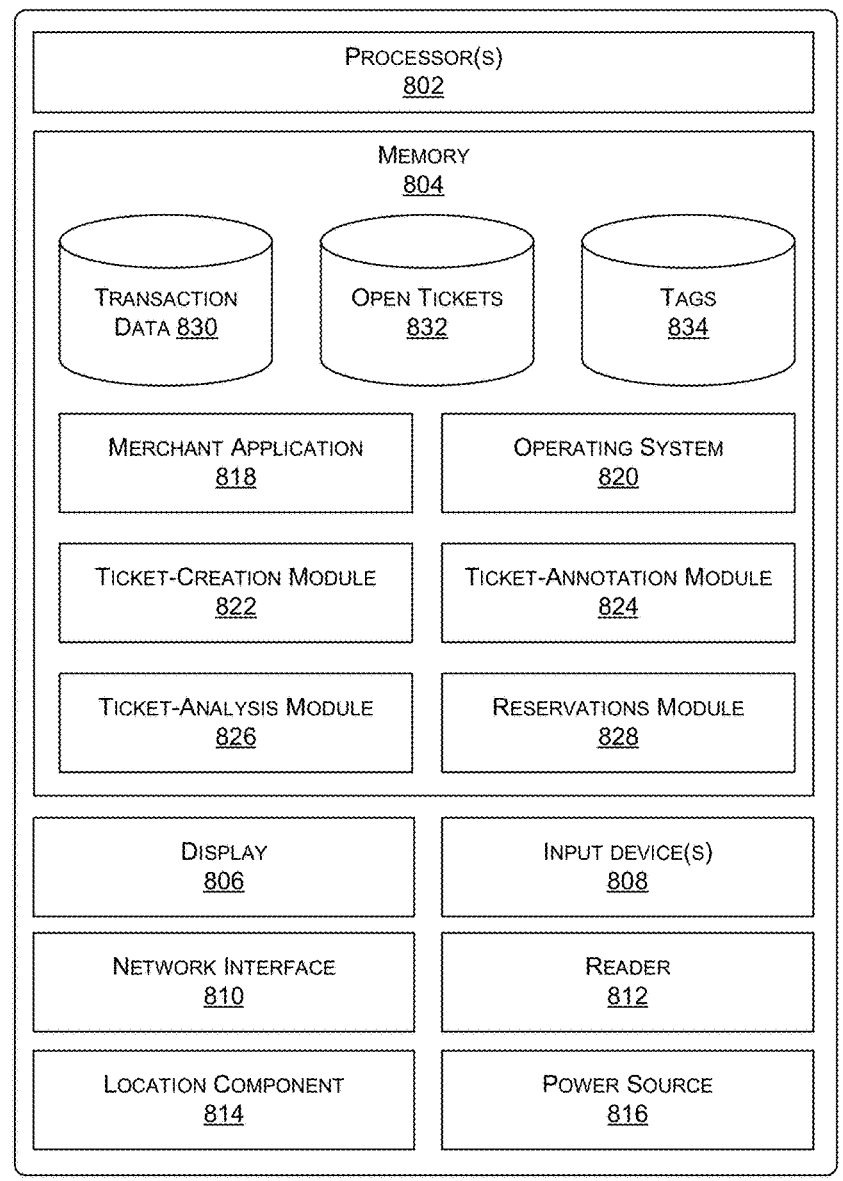
FIG. 8 illustrates select components of a POS device that a merchant described herein may utilize.

FIG. 8 illustrates select example components of an example POS device 800 according to some implementations. The POS device 800 may be any suitable type of computing device, e.g., mobile, semi-mobile, semi-stationary, or stationary. Some examples of the POS device 800 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein. Further, as described below, the POS device 800 may include some functionality previously recited as residing at the payments service. This may be in addition to or in the alternative to the functionality residing on the payments service 108. Further, in some implementations, the opposite may true. That is, some of the functionality described below with reference to the POS device 800 may additionally or alternatively reside at the payments service 108.

In the illustrated example, the POS device 800 includes at least one processor 802, memory 804, a display 806, one or more input devices 808, one or more network interfaces 810, at least one card reader 812, at least one location component 814, and at least one power source 816. Each processor 802 may itself comprise one or more processors or processing cores. For example, the processor 802 can be implemented as one or more microprocessors, microcomputers, microcontrollers, digital signal processors, central processing units, state machines, logic circuitries, and/or any devices that manipulate signals based on operational instructions. In some cases, the processor 802 may be one or more hardware processors and/or logic circuits of any suitable type specifically programmed or configured to execute the algorithms and processes described herein. The processor 802 can be configured to fetch and execute computer-readable processor-executable instructions stored in the memory 804.

Depending on the configuration of the POS device 800, the memory 804 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 804 may include, but is not limited to, RAM, ROM, EEPROM, flash memory, solid-state storage, magnetic disk storage, optical storage, and/or other computer-readable media technology. Further, in some cases, the POS device 800 may access external storage, such as RAID storage systems, storage arrays, network attached storage, storage area networks, cloud storage, or any other medium that can be used to store information and that can be accessed by the processor 802 directly or through another computing device or network. Accordingly, the memory 804 may be computer storage media able to store instructions, modules or components that may be executed by the processor 802. Further, when mentioned, non-transitory computer-readable media exclude media such as energy, carrier signals, electromagnetic waves, and signals per se.

The memory 804 may be used to store and maintain any number of functional components that are executable by the processor 802. In some implementations, these functional components comprise instructions or programs that are executable by the processor 802 and that, when executed, implement operational logic for performing the actions and services attributed above to the POS device 800. Functional components of the POS device 800 stored in the memory 804 may include a merchant application 818 that provides graphical user interfaces (GUIs) for allowing a merchant to add items, notes, tags, tenders, and the like to open tickets, and to request to process payments at the payments service 108. Further, the merchant application 818 may present an interface to enable the merchant to manage the merchant's account, and the like. Additional functional components may include an operating system 820 for controlling and managing various functions of the POS device 800 and for enabling basic user interactions with the POS device 800. The memory 804 may also store a ticket-creation module 822, a ticket-annotation module 824, a ticket-analysis module 826, and a reservations module 828. The ticket-creation module 822 may create open tickets for one or more customer based on any one of multiple triggering events. For instance, upon a customer arriving at a merchant and ordering an item, the module 822 may create an open ticket. Alternatively, the module 822 may create an open ticket in response to receiving, from the reservations module 828, an indication that the customer has created a reservation or been added to a waitlist. The ticket-annotation module 824, meanwhile, allows the merchant provide annotations in the form of notes and tags to the open tickets, as described above. The ticket-analysis module 826, meanwhile, may perform some or all of the analysis discussed above with reference to the ticket-analysis module 124. As such, the analysis described herein may occur on the POS device and/or remotely from the POS device at the payments service 108.

Finally, the memory 804 may store transaction data 830, open tickets 832, and one or more tags 834 for selection and association with the open tickets. The transaction data 830 represents data that is received based on the merchant associated with the POS device 800 engaging in various transactions with customers, such as the example customers 106 from FIG. 1. The open tickets 832, meanwhile, may reside on the POS device, which may provide some or all of the contents of these open tickets to the payments service 108 when the analysis is performed remotely from the POS device 800.

In addition, the memory 804 may also store data, data structures and the like, that are used by the functional components. For example, this data may include item information that includes information about the items offered by the merchant, which may include images of the items, descriptions of the items, prices of the items, and so forth. Depending on the type of the POS device 800, the memory 804 may also optionally include other functional components and data, which may include programs, drivers, etc., and the data used or generated by the functional components. Further, the POS device 800 may include many other logical, programmatic and physical components, of which those described are merely examples that are related to the discussion herein.

The network interface(s) 810 may include one or more interfaces and hardware components for enabling communication with various other devices over the network or directly. For example, network interface(s) 810 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 8 further illustrates that the POS device 800 may include the display 806 mentioned above. Depending on the type of computing device used as the POS device 800, the display 806 may employ any suitable display technology. For example, the display 806 may be a liquid crystal display, a plasma display, a light emitting diode display, an OLED (organic light-emitting diode) display, an electronic paper display, or any other suitable type of display able to present digital content thereon. In some examples, the display 806 may have a touch sensor associated with the display 806 to provide a touch screen display configured to receive touch inputs for enabling interaction with a graphic interface presented on the display 806. Accordingly, implementations herein are not limited to any particular display technology. Alternatively, in some examples, the POS device 800 may not include the display 806, and information may be present by other means, such as aurally.

In addition, the POS device 800 may include or may be connectable to a payment instrument reader 812. In some examples, the reader 812 may plug in to a port in the merchant device, such as a microphone/headphone port, a data port, or other suitable port. In other instances, the reader 812 is integral with the entire POS device 800. The reader may include a read head for reading a magnetic strip or memory chip of a payment card, and further may include encryption technology for encrypting the information read from the magnetic strip or the memory chip. Alternatively, numerous other types of card readers may be employed with the POS devices 800 herein, depending on the type and configuration of a particular POS device 800.

The location component 814 may include a GPS device able to indicate location information, or the location component 814 may comprise another other location-based sensor. The POS device 800 may also include one or more additional sensors (not shown), such as an accelerometer, gyroscope, compass, proximity sensor, and the like. Additionally, the POS device 800 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A point-of-sale (POS) device comprising:
   a display;
   one or more processors; and
   one or more computer-readable media storing computer-executable instructions that, when executed by the one or more processors, cause the one or more processors to perform acts comprising:
      generating a data structure for storing interactions between a customer and a merchant, the interactions occurring at least between arrival of the customer at a location associated with the merchant and obtaining of a payment by the merchant from the customer;
      receiving a request to create a reservation for the customer at the merchant, wherein the reservation is for a specified future time at the location associated with the merchant;
      based at least in part on receiving the request, storing, in the data structure, an identifier of the customer and an indication of the specified future time;
      receiving, after storing the identifier, an indication that the customer has arrived at the location associated with the merchant; and
      presenting, using the display, a visual representation of at least a portion of stored content of the data structure.

2. The POS device as recited in claim 1, the acts further comprising:
   receiving, before the specified future time, an indication of one or more preferences associated with the customer; and
   storing, in the data structure, the indication of the one or more preferences associated with the customer.

3. The POS device as recited in claim 2, the acts further comprising presenting the indication of the one or more preferences via the visual representation.

4. The POS device as recited in claim 1, the acts further comprising:
   receiving, before the specified future time, payment information associated with a payment instrument of the customer; and
   storing, in the data structure, the payment information for the customer.

5. The POS device as recited in claim 4, the acts further comprising:
   receiving input indicating that the customer ordered an item from the merchant;
   sending, to a payment service, a request to authorize the payment instrument for a cost of the item using the payment information stored in the data structure; and
   receiving, from the payment service, an indication that the payment instrument has been approved for the cost of the item.

6. The POS device as recited in claim 1, the acts further comprising:
   receiving, based at least in part on receiving the request, information identifying a profile of the customer from a payment service;
   identifying, from the profile, at least one preference of the customer; and
   storing, in the data structure, the at least one preference.

7. The POS device as recited in claim 1, the acts further comprising:
   receiving input indicating that the customer ordered at least one item from the merchant;
   updating the data structure to indicate that the customer ordered the at least one item from the merchant; and updating the visual representation of the data structure to indicate that the customer ordered the at least one item from the merchant.

8. A method implemented at least partly by a point-of-sale device, comprising:
generating, during a first period of time, a data structure to store interactions associated with a transaction between a customer and a merchant;
receiving a request to create a reservation for the transaction, wherein the reservation is for a specified future time at a location;
based at least in part on receiving the request, storing an identifier of the customer and an indication of the specified future time in the data structure;
receiving, during a second period of time, an indication that the customer has arrived at the location; and
presenting, on a display, a visual representation of at least a part of the data structure.

9. The method as recited in claim 8, further comprising:
receiving, before the second period of time, an indication of one or more preferences associated with the customer; and
storing, in the data structure, the indication of the one or more preferences associated with the customer.

10. The method as recited in claim 8, further comprising:
receiving, before the second period time, payment information associated with a payment instrument of the customer for use at the merchant during the transaction; and
storing, in the data structure, the payment information for the customer.

11. The method as recited in claim 10, further comprising:
receiving input indicating that the customer ordered an item;
sending, to a payment service, a request to authorize the payment instrument for a cost of the item using the payment information stored in the data structure; and
receiving, from the payment service, an indication that the payment instrument has been approved for the cost of the item.

12. The method as recited in claim 8, further comprising:
receiving, based at least in part on receiving the request, information identifying a profile of the customer from a payment service;
identifying, from the profile, at least one preference of the customer; and
storing, in the data structure, the at least one preference.

13. The method as recited in claim 8, further comprising:
receiving input indicating that the customer ordered an item from the merchant;
updating the data structure to indicate that the customer ordered the item; and
updating the visual representation of the data structure to indicate that the customer ordered the item.

14. The method as recited in claim 8, wherein storing the identifier of the customer and the indication of the specified future time in the data structure occurs before the second period of time.

15. A point-of-sale (POS) device comprising:
a display;
one or more processors; and
one or more computer-readable media storing computer-executable instructions that, when executed by the one or more processors, cause the one or more processors to perform acts comprising:
generating, during a first period of time, a data structure to store interactions between a customer and a merchant during a transaction;
storing, as part of the data structure, an identifier for the customer and an indication of a specified future time associated with a reservation for the transaction at a location;
receiving, during a second period of time, an indication that the customer has arrived at the location; and
presenting, using the display, a visual representation of at least part of the data structure.

16. The POS device as claim 15 recites, the acts further comprising receiving a request to create the reservation for the customer, wherein the request indicates the specified future time.

17. The POS device as recited in claim 15, the acts further comprising:
receiving, before the second period of time, an indication of one or more preferences associated with the customer; and
storing, in the data structure, the indication of the one or more preferences associated with the customer.

18. The POS device as recited in claim 15, the acts further comprising:
receiving, before the second period of time, payment information associated with a payment instrument of the customer for use at the merchant during the transaction; and
storing, in the data structure, the payment information for the customer.

19. The POS device as recited in claim 18, the acts further comprising:
receiving input indicating that the customer ordered an item;
updating the data structure to indicate that the customer ordered the item;
sending, to a payment service, a request to authorize the payment instrument for a cost of the item using the payment information stored in the data structure;
receiving, from the payment service, an indication that the payment instrument has been approved for the cost of the item; and
updating the visual representation of the data structure to indicate that the payment instrument was approved.

20. The POS device as recited in claim 15, the acts further comprising:
receiving information identifying a profile of the customer from a payment service;
identifying, from the profile, at least one preference of the customer, the at least one preference including:
a dietary restriction of the customer;
a tipping preference of the customer; or
an item preferred by the customer; and
storing, in the data structure, the at least one preference.

* * * * *